Sept. 9, 1969  T. O. SUMMERS  3,465,840
GYRO STABILIZED CENTER TRACKING VEHICLE
Filed March 14, 1967  11 Sheets-Sheet 1
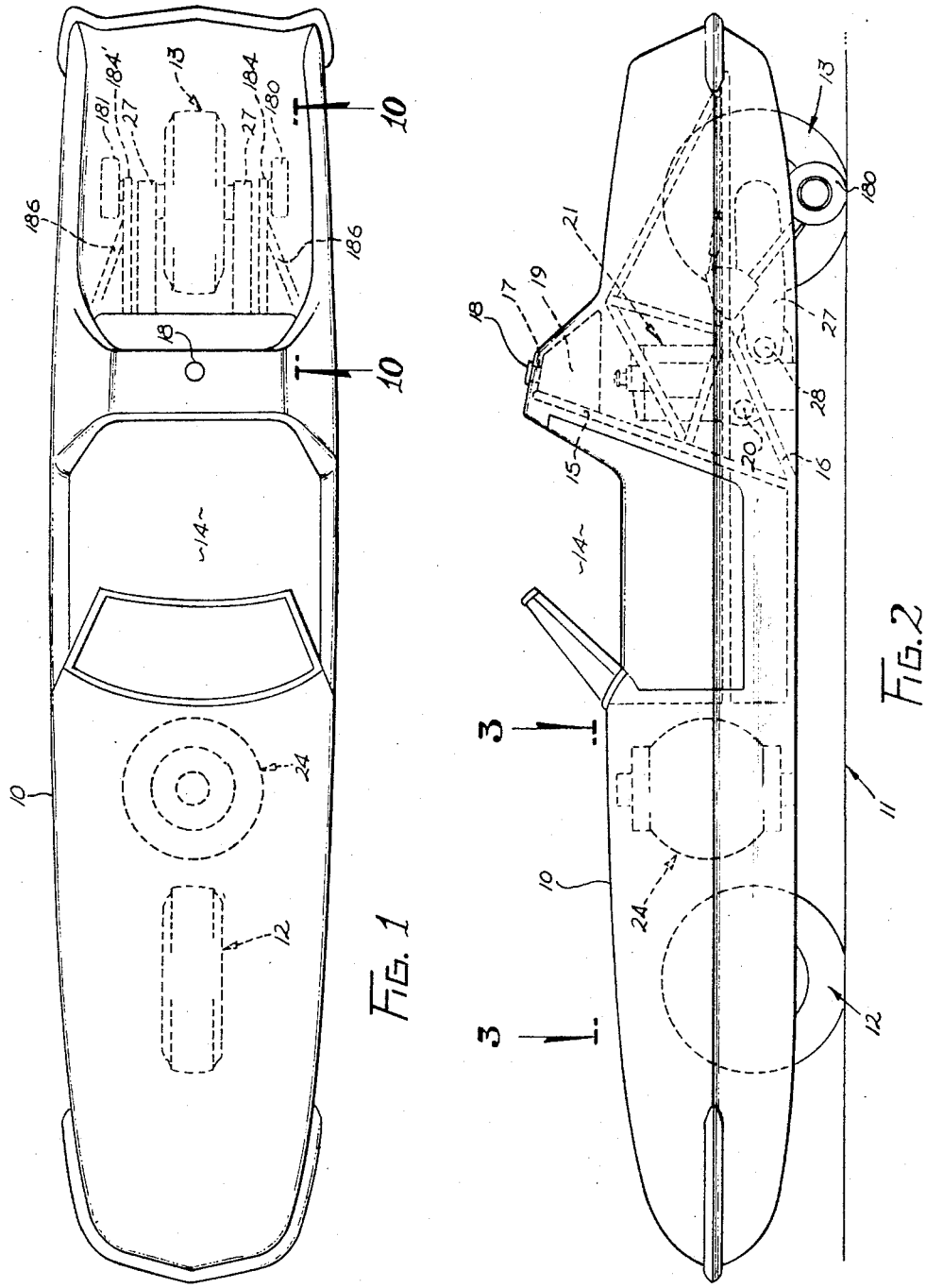
THOMAS O. SUMMERS,
INVENTOR.
BY R. E. Geauque
ATTORNEY

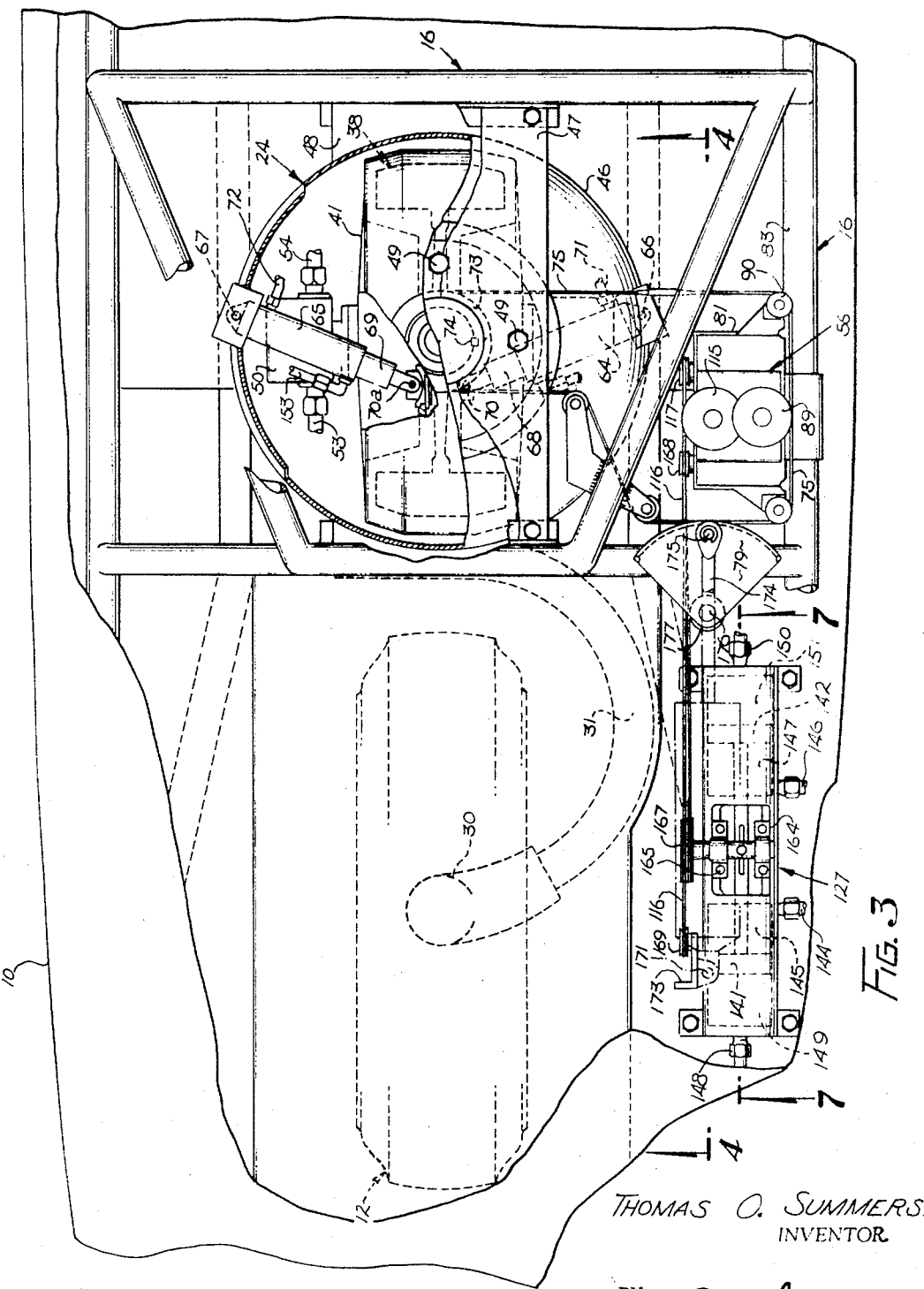

Sept. 9, 1969     T. O. SUMMERS     3,465,840
GYRO STABILIZED CENTER TRACKING VEHICLE
Filed March 14, 1967     11 Sheets-Sheet 3

THOMAS O. SUMMERS,
INVENTOR.

BY R.E. Geauque

ATTORNEY

THOMAS O. SUMMERS
INVENTOR

BY R. E. Geanger
ATTORNEY

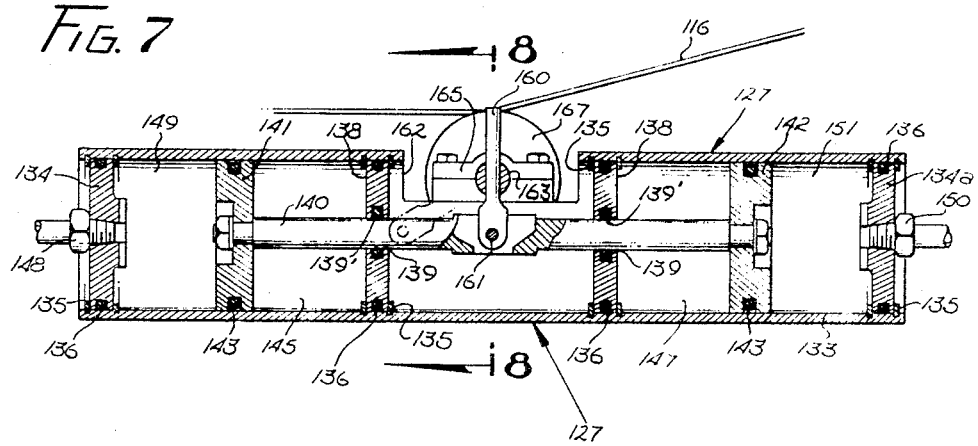
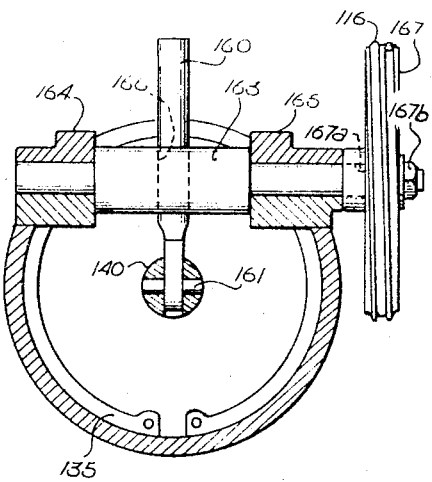
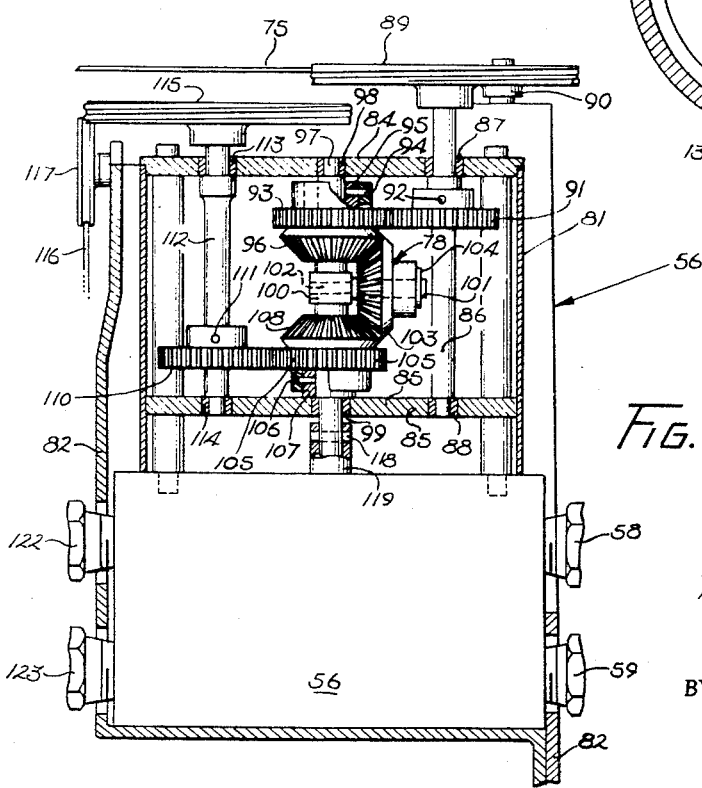

INVENTOR.
THOMAS O. SUMMERS,
BY
R. E. Geauque
ATTORNEY

THOMAS O. SUMMERS
INVENTOR.

BY R. E. Geanger
ATTORNEY

Sept. 9, 1969                       T. O. SUMMERS                      3,465,840
                       GYRO STABILIZED CENTER TRACKING VEHICLE
Filed March 14, 1967                                              11 Sheets-Sheet

THOMAS O. SUMMERS
INVENTOR.

BY R. E. Geangue
ATTORNEY

Sept. 9, 1969 T. O. SUMMERS 3,465,840
GYRO STABILIZED CENTER TRACKING VEHICLE
Filed March 14, 1967 11 Sheets-Sheet 10

THOMAS O. SUMMERS
INVENTOR.

BY R. E. Geaugne
ATTORNEY

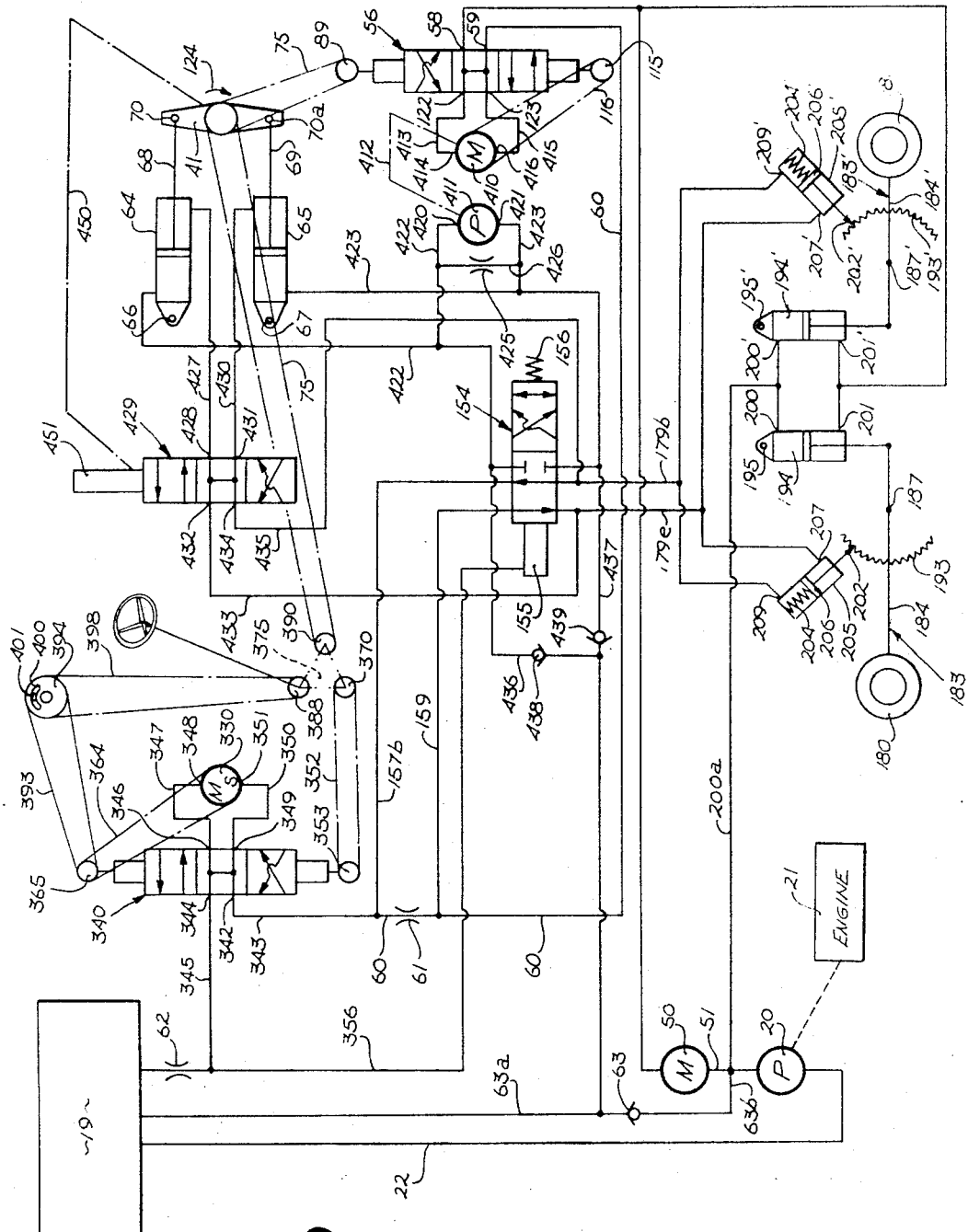

United States Patent Office 3,465,840
Patented Sept. 9, 1969

3,465,840
GYRO STABILIZED CENTER TRACKING VEHICLE
Thomas O. Summers, 1536 Fairway Drive,
Camarillo, Calif. 93010
Continuation-in-part of application Ser. No. 583,776,
Oct. 3, 1966. This application Mar. 14, 1967, Ser.
No. 632,871
Int. Cl. B62d 61/00, 37/06
U.S. Cl. 180—30                                    28 Claims

ABSTRACT OF THE DISCLOSURE

A tandem wheeled steerable automobile having outrigger parking gear is stabilized against roll by a large brute force gyro having a lateral spin axis and a vertical gimbal axis. Roll equilibrium is maintained by application of a vehicle righting gimbal torque as a function of gimbal precession rate. Gimbal drift resulting in gimbal displacement is erased by application of a drift correcting gimbal torque in the direction of the displacement.

---

This is a continuation-in-part of my co-pending application Ser. No. 583,776, filed Oct. 3, 1966 now abandoned.

This invention relates to gyroscopically stabilized vehicles and particularly to steerable, center tracking wheeled vehicles supported in unstable equilibrium about a roll axis.

In conventional center tracking vehicles, such as motorcycles, unstable equilibrium is maintained while the vehicle is in motion by banking the vehicle to offset disturbing moments; however, at zero or near zero speeds a rider cannot effectively stabilize such conventional center tracking vehicles. On the other hand, a gyroscopically stabilized center tracking vehicle, according to the present invention, will be able to resist disturbing moments about its roll axis regardless of its speed and may be freely steered.

The gyro and the vehicle of the present invention have a common roll axis; for example; a line defined by the points of contact of the vehicle's wheels with the ground. Actually, the banking capability of the vehicle of the present invention eliminates the need for a roll gimbal ring or roll gimbal. Thus, with only a single gimbal comprising a pivoted rotor bearing frame, the gyro is supported for precessional freedom about two axes; the common roll axis, and a gimbal axis substantially parallel to a plane perpendicular to the roll axis.

In order for the single gimbal gyro of the present invention to be effective in stabilizing the vehicle against disturbing moments in either direction about the vehicle's roll axis, the spin axis of the gyro rotor should, of course, be substantially perpendicular to the precession axis of the pivoted rotor bearing housing or gimbal, and it is desirable that the gyro gimbal be maintained in a normal or centered position in which the spin axis is approximately parallel to a plane perpendicular to the vehicle's roll axis.

Whenever the roll equilibrium of the vehicle of the present invention is disturbed, this disturbance is, of course, manifested by gimbal precession according to the direction of and at a rate proportional to the disturbing moment. Means are provided for sensing this direction and precession rate, and a torque is produced about the gimbal axis, which torque is in the direction of gimbal precession and is a function of gimbal precession rate. This applied gimbal torque is in such a direction as to precess the vehicle into an equilibrium position about its roll axis and thereby stop gimbal precession. This torque which is applied automatically as a function of rate of gimbal precession, sometimes referred to herein as motion responsive torque and sometimes as rate responsive torque, while effective in stopping gimbal precession, is without effect in restoring the gimbal to its normal centered position. Therefore, means are also provided for automatically applying a torque about the gimbal axis in a direction to restore the gimbal to its normal centered position when it drifts therefrom. This latter torque, however, is a function of gimbal displacement rather than gimbal rate and effects rather than stops gimbal precession. During normal operation of the vehicle, this displacement responsive torque is in the direction of gimbal displacement and causes the vehicle to precess about its roll axis, thereby disturbing the equilibrium of the vehicle. This precession of the vehicle away from its equilibrium position about its roll axis produces roll torque in a direction to precess the gimbal toward its normal position. Thus, according to the present invention two torques are applied about the gimbal axis; one, a function of gimbal rate for the purpose of stopping gimbal precession, and the other, a function of gimbal displacement for the purpose of restoring the gimbal to its normal position.

The two torques which are applied to the gyro gimbal, i.e. the gimbal rate responsive torque and the displacement responsive torque, alone determine the roll rate of the vehicle, which is directly proportional to the algebraic sum of these two torques. Only if the algebraic sum of these gimbal torques is sufficiently high to assure controlled precession of the gyro vehicle about its roll axis at a higher angular rate than roll torque precesses the gimbal, may the vehicle be depended upon to remain upright. If the gyro should precess faster about the gimbal axis than about the roll axis, the gimbal might precess hard over before the vehicle could reach its equilibrium position, and cause the vehicle to tip over.

The function of the rate responsive gimbal torque is only to roll precess the gyro vehicle into equilibrium, but the displacement responsive gimbal torque can to roll precess the vehicle out of its equilibrium position to generate a roll torque in a direction to center the gimbal. Only motion responsive gimbal torque may be relied upon to precess the vehicle toward its equilibrium position in roll, and its effect may be decreased by the displacement responsive gimbal torque.

The rate responsive gimbal torque must, therefore, have a higher maximum value than gimbal torque sensitive to gimbal position. Thus, to keep the vehicle from tipping over, it is apparent that the algebraic sum of these two gimbal torques must always exceed the maximum roll torque that can be exerted against the vehicle. In high speed turns entered suddenly, disturbing roll torque can be very high; and, not only must the rate responsive, gimbal torquing motor be capable of applying an even higher torque about the gimbal axis, but it must apply such torque at a higher rate than the gimbal can precess in response to any roll torque likely to be encountered.

Such a high power requirement for the torquing motor may, under certain conditions, limit the maneuverability of the vehicle described in my aforesaid application. It has been found, however, that this power requirement may be reduced by augmenting the two gimbal torquing systems with a novel adaptation of gimbal steering.

In known automotive gyro vehicles employing gimbal steering, the front wheel is steered by a servo connected in a closed servo loop with the gimbal so that displacement of the front wheel about its steering axis is proportional to gimbal displacement. Such a vehicle automatically steers in a direction to retard gimbal precession. Gimbal precession is ideally slow when controlled by such automatic steering. The slightest gimbal precessional movement quickly steers the vehicle into roll equilibrium to hold down the precession rate. By reducing gimbal precession rates, the power requirements of the gimbal torquer is correspondingly reduced, and essential high gimbal torque requirements can be met with a relatively low speed torque motor of moderate proportions.

In known prior gimbal steering systems, to initiate a turn it is the practice to first disturb the equilibrium of the vehicle about its roll axis, by roll precessing or banking the vehicle toward the inside of the desired turn. This is accomplished by manually controlled gimbal torquing, in consequence of which the vehicle precesses or banks about its roll axis. However, the time required for such roll precession may, under certain conditions, impose steering ilimtations. After the vehicle is banked the resulting roll moment precesses the gimbal and displaces the front wheel about its steering axis accordingly. But gimbal precession also takes time. Thus, the driver is required to anticipate or lead a turn according to both roll precession time and gimbal precession time. Such a steering system in a high speed vehicle requires a high level of skill on the part of the driver.

Also, in known prior gimbal steering systems, during a turn the gimbal is displaced from its normal or center position according to the turn radius. If the turn radius is short and an inexperienced or unattentive driver should accidentally overbank the vehicle, the gimbal might move hard over against a gimbal stop and permit the vehicle to fall.

Gimbal steering as proposed by the present invention avoids this possible condition by allowing the gimbal to remain in its center position independently of the turn radius. Also, the steering time lag is reduced considerably. These improvements are accomplished by biasing the null position of the steered front wheel relative to the normal position of the gimbal. Such biasing is controlled manually by a steering wheel. Turning the steering wheel biases the null, causing a steering motor to steer the front wheel, and turn the vehicle before it banks. The resulting roll torque precesses the gimbal, causing automatic application of rate responsive gimbal torque, which co-ordinates the turn by precessing the vehicle into equilibrium about its roll axis.

By employing negative caster for the front steered wheel, gimbal steering also can be made effective in controlling gimbal precession, when the vehicle is stationary. The slightest gimbal movement displaces the front wheel proportionately about its steering axis, and because of negative caster, the center of gravity of the vehicle is shifted accordingly relative to the roll axis, until gimbal precession is stopped by roll torque. Thus, should a heavy person suddenly move his weight laterally relative to the roll axis, the vehicle will, almost as suddenly, shift its weight in the opposite direction.

In addition, the rate responsive gimbal torque will bank the vehicle in a direction to augment roll torque due to gimbal steering. Very little bank or roll precession will have time to occur, however, due to the direct and consequently faster action of gimbal steering in producing equilibrating roll torque.

When the gyro employed to stabilize such a vehicle is at rest, the vehicle can tip over unless means are provided for supporting it against roll freedom. This may be accomplished by retractable outrigger side supports which may be raised for normal operation and lowered and locked against roll when the vehicle is parked for a prolonged period. It is desirable, however, that when the vehicle is in this prolonged anti-roll parking mode, that the gimbal be "caged" or centered to its normal position prior to restoration of roll freedom, so that the gimbal will be in its most effective stabilization position upon removal of side support.

A convenient method of centering the gimbal when the vehicle is locked against roll precession is to reverse the direction of the gimbal displacement or centering torque. That is, when the vehicle is locked against roll, the direction of the displacement responsive or centering torque should be opposite to the direction of gimbal displacement, instead of in the same direction, as is the case when the vehicle is in its normal mode. The reason for this reversal is that in the normal operating mode of the vehicle, the gimbal is precessed to its center position as a result of a gimbal displacement torque which disturbs roll equilibrium in a direction to precess the gimbal toward its normal position. In the anti-roll mode, however, the same gimbal torque cannot precess the vehicle, and therefore results in angular gimbal movement away from center or in the direction the torque is applied, instead of angular movement toward center or in a direction opposite to the direction the torque is applied.

It is a primary object of the present invention to provide an improved steerable, gyro stabilized center tracking vehicle, stabilized by a single gimbal gyro oriented as described above and capable of resisting disturbing roll moments and remaining upright independently of the vehicle's state of motion.

Another object is to provide such a vehicle in which a single gimbal gyro is employed to resist rolling moments of the vehicle about the vehicle's roll axis and which is effective to precess the vehicle about its roll axis upon the application of torque about the gyro gimbal axis.

Another object is to provide such a gyro stabilized vehicle in which a torque is applied to the gyro about its gimbal axis as a function of gimbal precession rate.

Another object of the invention is to provide such a gyro stabilized center tracking vehicle in which the gyro will resist a disturbing moment about the roll axis of the vehicle, by gimbal precession at a rate proportional to the disturbing moment, and in which a rate generator mechanical produces a gimbal torque in response to such precession, which torque is in a direction to precess the vehicle about its roll axis into its equilibrium position and stop the gimbal precession.

Another object of the invention is to provide such a gyro stabilized vehicle in which two torques are applied about the gyro gimbal axis; one in the direction of gimbal motion and the other, in the direction of gimbal displacement from a normal position.

Another object is to provide an improved steerable center tracking vehicle stabilized by a single gimbal gyro capable of resisting disturbing roll moments on the vehicle and effective to precess the vehicle about its roll axis upon application of torque about its gimbal axis, and in which the steered wheel of the vehicle is steered in response to gimbal precession.

Another object is to provide such a vehicle in which a manually controlled steering wheel is employed to bias the null position of the steered vehicle wheel relative to the gyro gimbal position to thereby permit manually controlled steering of the vehicle independently of the gimbal position.

Another object of the invention is to provide such a gyro stabilized vehicle in which a retractable parking support is lowered to provide side support for the vehicle during prolonged idle periods; and in which the gyro gimbal is centered to its normal position prior to retraction of vehicle side support.

Other objects and advantages not specifically set forth above will become readily apparent from the accompanying description and drawings in which:

FIGURE 1 is a top plan view of the gyro stabilized center tracking vehicle showing the gyro and supporting wheels;

FIGURE 2 is a side elevational view of the gyro stabilized vehicle of FIGURE 1 illustrating the outrigger parking wheels;

FIGURE 3 is an enlarged partial top plan view along line 3—3 of FIGURE 2 illustrating the gyro torquing mechanism;

FIGURE 7 is a vertical section along line 7—7 of FIGURE 3 showing a portion of the rate generating mechanism;

FIGURE 8 is a transverse vertical sectional view along line 8—8 of FIGURE 7;

FIGURE 9 is a partial transverse vertical section along line 9—9 of FIGURE 4 illustrating the valve control means for the rate generating means;

FIGURE 19 is a schematic of the hydraulic control system employed in the gimbal steering embodiment of the vehicle.

Figure 4:
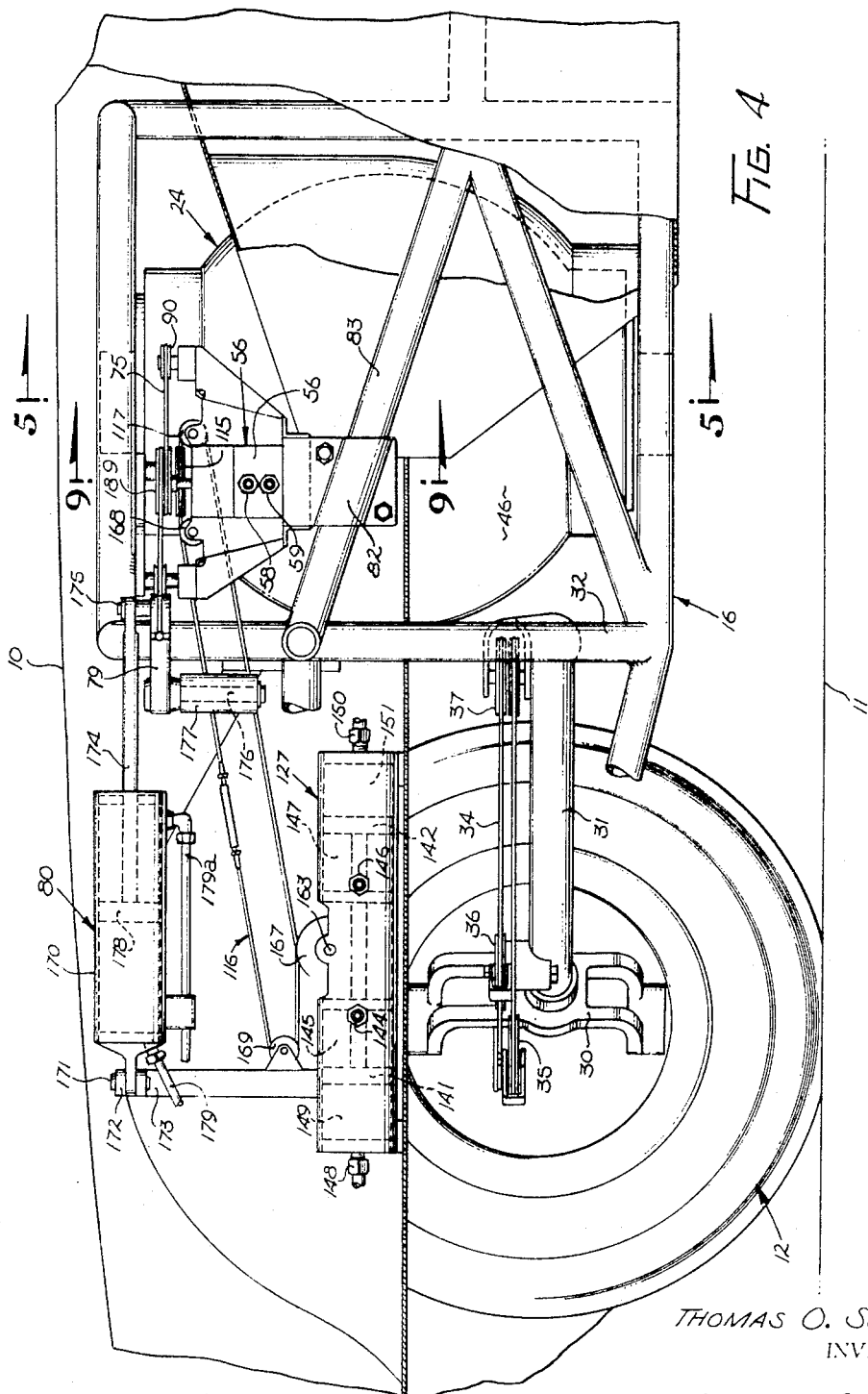
FIGURE 4 is a partial vertical section along line 4—4 of FIGURE 3.
Figure 5:
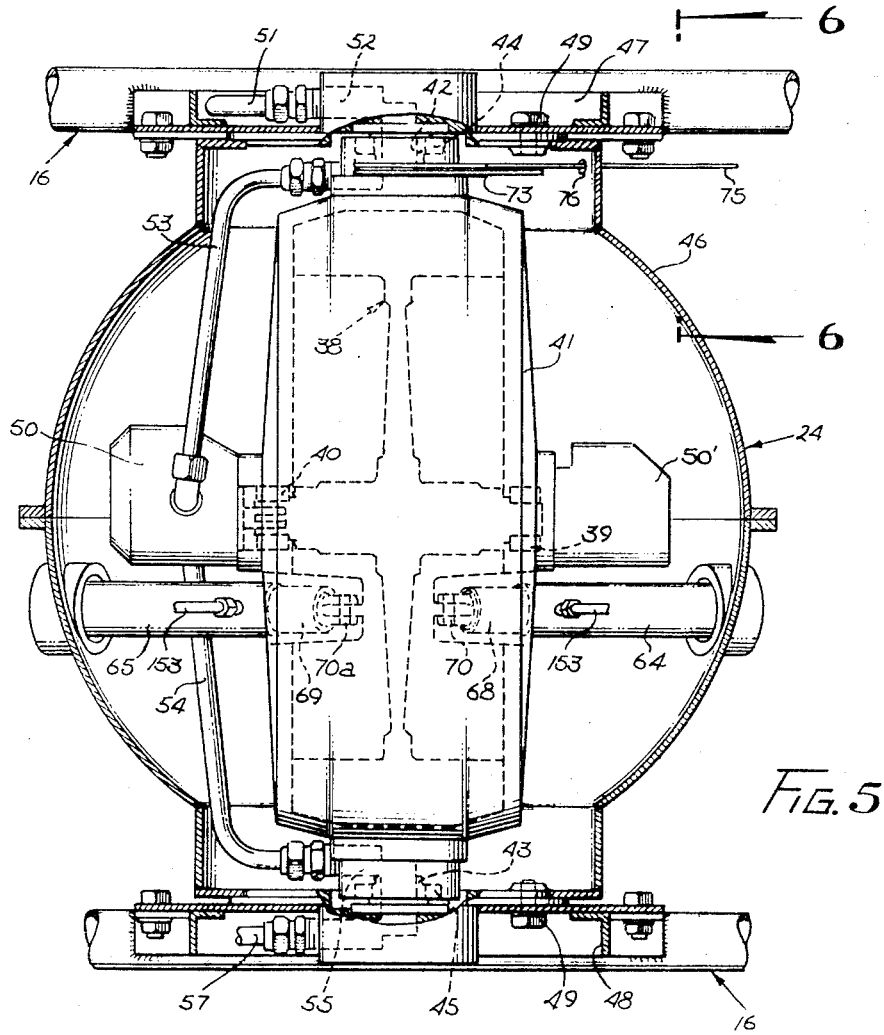
FIGURE 5 is a transverse vertical section along line 5—5 of FIGURE 4 showing the gyro torquing motors.
Figure 6:
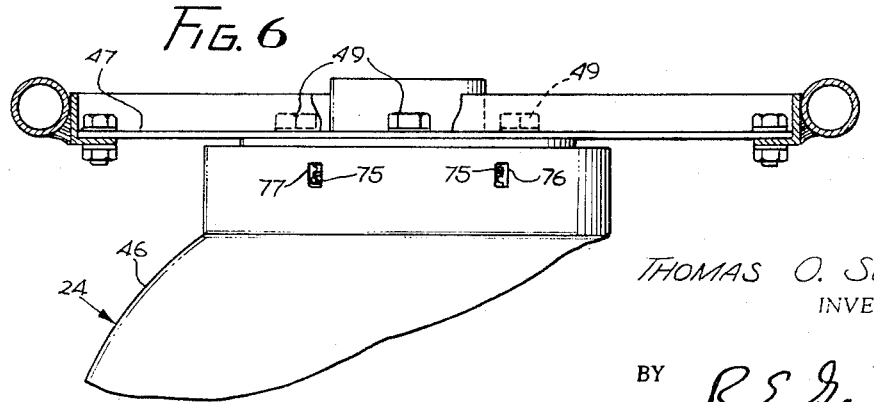
FIGURE 6 is a vertical partial section along line 6—6 of FIGURE 5 showing the gyro gimbal supported by the vehicle frame.
Figure 10:
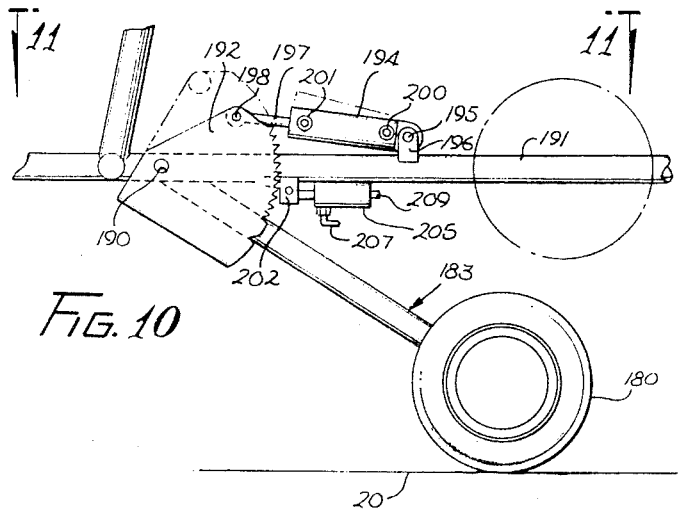
FIGURE 10 is an enlarged fragmentary view showing the parking gear of the vehicle.
Figure 11:
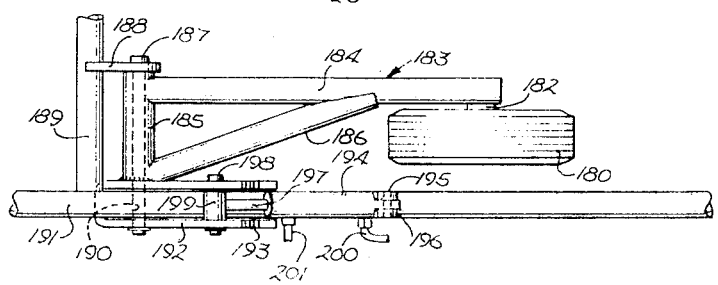
FIGURE 11 is a top plan view along line 11—11 of FIGURE 10.
Figure 12:
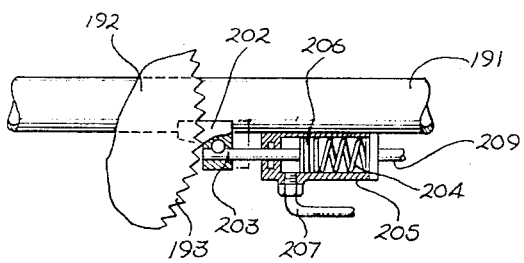
FIGURE 12 is an enlarged fragmentary view showing the ratchet release mechanism for the parking gears.

Referring now to the drawings in detail, a vehicle embodying the present invention is referred to generally by the reference numeral 10 and is supported for movement over a supporting surface 11 by a front wheel 12 and a rear wheel 13. The wheels 12, 13 are located in the longitudinal, vertical center plane of the vehicle to support the vehicle for roll freedom about an axis passing through the points of contact of the wheels with the support surface. The front wheel 12 can be steered by the operator occupying the vehicle passenger compartment 14 in a manner hereinafter described. A conventional roll bar 15 is welded to the vehicle frame 16 to provide passenger safety in the event the vehicle should roll over. A filler neck 17 having a removable cap 18 sunk partly into the body of the vehicle, is attached to a tank 19 so that oil may be poured into the neck 17 to form a reservoir of oil in the tank. The oil tank 19 is attached to the roll bar 15 and is situated in the uppermost portion of the vehicle to provide a gravity head for an engine driven, variable volume, constant pressure, hydraulic pump 20 mounted on the engine 21 supported on the vehicle frame 16 rearwardly of the passenger compartment 14 and directly under reservoir 19. Oil from reservoir 19 is directed to pump 20 by line 22.

A gyro 24 for stabilizing the vehicle is mounted on the vehicle forward of the passenger compartment 14. The rear wheel 13 is supported by a pair of arms 27, which are pivoted at one end at 28 to the vehicle frame, and the opposite ends of the arms rotatably support the rear wheel 13. One or both the arms 27 can contain chains or other suitable drive mechanism extending between the engine and the wheel in order to propel the vehicle while permitting up and down movement of the wheel about pivot 28. The center of gravity of the gyro 24 and the center of gravity of the engine 21 are preferably located on the longitudinal center plane of the vehicle.

In the embodiment of the invention shown in FIGURES 1–16, and as best seen in FIGURES 3 and 4, the front wheel 12 is mounted on an axle supported by a suitable king pin (not shown) mounted in a bracket 30 rigidly fixed on the forward end of an elongated, curved arm 31 which, in turn, is mounted at its other end for pivotal movement about a horizontal axis by suitable bearings supported on member 32 of frame 16. A cable 34 has its ends fixed to the axle support and extends over fair-lead pulleys 35, 36 on bracket 30 and fair-lead 37 on frame 16 to a steering wheel (not shown) in the passenger compartment 14 to permit the operator to steer the front wheel. This wheel support and steering mechanism is conventional and forms no part of the present invention.

The gyro 24 comprises a rotor 38 mounted for rotation about a substantially horizontal axis by bearings 39, 40 in a rotor bearing housing or gimbal 41, which, in turn, is supported by stub shafts 42, 43 for pivotal movement about a substantially vertical axis in bearings 44, 45. The entire gyro assembly is contained within a spherical housing 46 rigidly supported by brackets 47, 48 on the frame 16, as by bolts 49. Rotor 38 is rotatably driven by a hydraulic motor 50 mounted on gimbal 41. A suitable counterweight 50' may be mounted on gimbal 41 to balance the weight of motor 50. Hydraulic fluid under pressure is supplied to the motor 50 through line 51, drilled passage 52 extending through stub shaft 42, and conduit 53. Fluid is exhausted from motor 50 through conduit 54, drilled passage 55 extending through stub shaft 43, and is directed into an open center, four way, control valve 56 through conduit 57 and pressure port 58. Motor 50 is protected against high pressure damage by a relief valve 58a connected between lines 57 and 62 by lines 58b and 58c so that should oil flow through valve 56 become blocked, oil from motor 50 will bypass valve 56 and return to tank 19 through relief valve 58a. Fluid from valve 56 is exhausted into reservoir 19 through return port 59, conduit 60, in which is a restrictor 61, and conduit 62 in which is a restrictor 62'. Restrictors 61 and 62' are basically line reducers of different sizes affording resistance to fluid flow; restrictor 61 effecting a greater reduction than restrictor 62', so that at any given flow rate the pressure drop across restrictor 61 is greater than the pressure drop across restrictor 62'.

The input side of a one-way check valve 63 is connected to reservoir 19 by conduit 63a and the output side is connected by conduit 63b to oil line 51 extending between pump 20 and motor 50. In the absence of pressure in oil line 51, oil is allowed to flow freely under gravity head pressure from reservoir 19 into hydraulic motor 50 through the check valve, but the check valve prevents reverse flow from the line 51 into reservoir 19.

A pair of hydraulic torquers or cylinders 64, 65 each have one end pivoted to spherical housing 46 as by pins 66, 67 (see FIGURE 3), one on each side of the gimbal 41 at a point spaced rearwardly of the gimbal axis. The piston rods 68, 69 of cylinders 64, 65 respectively, have their free end pivoted to the gimbal, as by pins 70, 70a, at points spaced forward of the gimbal axis. Fluid under pressure may be selectively directed to the head end of these fluid cylinders 64, 65 through pressure lines 71, 72 to apply torque to the gimbal about the normally vertical gimbal axis in either direction.

A pulley 73 is rigidly mounted on gimbal 41, by key 74, for rotation with the gimbal upon precession of the gyro about the gimbal axis. A cable 75 extends around pulley 73 and outwardly through openings 76, 77 (FIGURE 6) in spherical housing 46 to position the input side of a differential drive mechanism 78 of control valve 56 and to position a pivoted quadrant 79 of a hydraulic spring 80.

Referring now to FIGURE 9, it is seen that the differential drive mechanism 78 comprises a housing 81 mounted on a bracket 82 which, in turn, is supported on brace member 83 of frame 16. Housing 81 includes upper and lower bearing plates 84, 85 which support an input shaft 86 journaled for rotation about a vertical axis in bearings 87, 88. A pulley 89 is rotatably fixed on the upper end of shaft 86 and cable 75 extends from the gyro over fair-lead pulley 90 and around the outer periphery of pulley 89. Thus, rotation of gimbal 41 will drive pulley 89 and shaft 86 in a direction and in an amount corresponding to the rotation of the gimbal.

A spur gear 91 is rotatably fixed, as by pin 92, on shaft 86 and meshes with a spur gear 93. Spur gear 93 is rotatably fixed, as by pin 94, on hub 95 of a bevel gear 96 which, in turn, is rotatably supported on shaft 97. Shaft 97 has its ends journaled for rotation by bearings 98, 99 in plates 84, 85, respectively and has an enlarged segment 100 formed in its center portion. A horizontal stub shaft 101 is rotatably fixed in a drilled passage 102 in enlarged segment 100 of shaft 97 and a bevel gear 103 is supported for free rotation on shaft 101. A snap ring 104 retains gear 103 on shaft 101.

A second spur gear 105 is rotatably fixed as by pin 106 on the hub 107 of a third level gear 108 which in turn, is mounted for free rotation on shaft 97, with bevel gears 108 and 96 being opposed to one another and mounted on opposite sides of enlarged segment 100 of shaft 97. Bevel gear 103 meshes with gears 96 and 108 so that rotation of either or both of the gears 96 and 108 will result in rotation of bevel gear 103 about shaft 101. However, when only one of gears 96 or 108 is rotated and the other held stationary, bevel gear 103 will rotate on shaft 101 and will simultaneously rotate shaft 97 about its axis.

The spur gear 105 meshes with a spur gear 110 which is rotatably fixed by pin 111 on a shaft 112 which, in turn, is journaled for rotation by bearings 113, 114 in plates 84, 85, respectively. A follow-up pulley 115 is rotatably fixed on the end of shaft 112 for rotation by a cable 116 extending over the fair-lead pulley 117 mounted on bracket 82. Cable 116 is driven by the follow-up mechanism of a rate piston hereinafter described.

From the above, it is seen that rotation of the input pulley 89 in either direction by precessional movement of the gyro while follow-up pulley 114 is held stationary, will result in the differential drive mechanism 78 rotating shaft 97 in a direction and in an amount corresponding to the direction and amount of precessional movement of the gyro gimbal about the gimbal axis. Also, rotation of follow-up pulley 115 by cable 116 while input pulley 89 is held stationary will result in rotation of shaft 97 according to the direction and the amount pulley 115 is rotated.

Shaft 97 is connected by pin 118 to the shaft 119 of rotary control valve 56 so that rotational movement of shaft 97 in one direction, will connect pressure port 58 to port 122, and return port 59 to port 123; and in the other direction, will connect pressure port 58 to port 123 and return port 59 to port 122. When shaft 97 is centered, however, and valve 56 is in its normal position, all of the ports 58, 59, 122 and 123 of valve 56 are in mutual communication. With valve 56 in its center position, if the follow-up pulley 115 is held stationary, and the gimbal 41 is pivoted in the direction of the arrow 124 (FIGURE 13), ports 58 and 122 will connect exclusively, as will ports 59 and 123. Conversely, if gimbal 41 is pivoted in the opposite direction, ports 59, 122 connect, and ports 58, 123 connect.

Upon a displacement of shaft 97 by gimbal rotation, follow-up, or reverse motion of shaft 97 back toward its center position, is initiated by a combination motor-pump or rate cylinder 127, which rate cylinder is, in effect, two separate cylinders each having a piston mounted therein with the separate pistons being mounted on opposite ends of a common piston rod for simultaneous movement in a direction to bring about such follow-up movement of shaft 97.

Rate cylinder 127 comprises an elongated cylinder housing 133 having its opposite ends closed by a pair of disc-shaped cylinder heads 134, 134a retained in position by snap rings 135. A fluid seal is maintained between cylinder heads 134, 134a and the inner surface of the cylindrical housing 133 by O-ring seals 136 around the periphery of cylinder heads 134, 134a. A pair of disc-shaped plugs 138 are mounted within the cylindrical housing 133 at a point spaced from each end of the cylindrical housing to define a pair of closed cylinders one in each end of housing 133. Plugs 138 are retained and sealed in position by snap rings 135 and O-ring seals 136 respectively, in a manner similar to cylinder heads 134, 134a, and have concentric circular openings 139 which receive piston rod 140 extending into the closed cylinders at each end of housing 133. Suitable O-ring seals 139' are provided within openings 139 and in plugs 138 to form a seal with rod 140. A pair of pistons 141, 142 are mounted, one on each of rod 140, for reciprocal movement within the respective cylinders. The outside diameter of each piston 141 and 142 is slightly less than the inside diameter of the cylinder within which it moves to allow free piston movement, and anti-friction seals 143 block oil flow over the periphery of the pistons.

Port 122 of valve 56 is connected to the rate cylinder 127 through port 144 to communicate with chamber 145 on the rod side of piston 141, and port 123 is connected through port 146 to communicate with chamber 147 on the rod side of piston 142. Port 148 in cylinder head 134 is connected to line 71, providing fluid communication between chamber 149 of the rate cylinder and the head chamber of torquing cylinder 64 and a port 150 formed in cylinder head 134a is connected to line 72, providing fluid communication between the chamber 151 and the head chamber of torquing cylinder 65. Fluid communication between head chamber 149 and 151 across a restrictor 152 is provided by lines 152a and 152b, connecting lines 71 and 72, respectively, to the opposite ends of the restrictor, and free flow is provided by a line 153 between the rod chambers of cylinders 64, 65. Thus, fluid pressure directed to either of the chambers 145 or 147 will result in movement of the pistons 141, 142 in a direction to pressurize fluid within the chamber 149 or 151 to thereby pressurize one of the torquing cylinders 64, 65 to apply torque to the gyro about the gimbal axis; which torque, of course, is a function of the size of the restrictor 152.

To provide on-off control of the application of gimbal torque according to piston movement within rate cylinder 127, free flow fluid communication between lines 71 and 72 is controlled by a pilot operated spring return valve 154 connected across lines 71, 72 by lines 154a, 154b respectively. Fluid communication between line 60 and pilot 155 of valve 154 is provided by lines 155a, 155b and 155c, so that when the system is operating and there is flow across restrictor 61, the resulting back pressure in line 60 causes pilot 155 to shift valve 154 from its normal position and compress return spring 156. This restricts flow between chambers 149 and 151 of rate cylinder 127. Also, when valve 154 is shifted by the pilot 155, pressure from line 60 pressurizes port 157 of valve 154, and port 157a is connected to tank 19 through valve 154 by lines 157b and 62.

When there is little or no flow across restrictor 61, such as when the system is shut off or the gyro has not yet attained its normal operating speed, the spring 156 will maintain valve 154 in a position allowing free flow between line 71 and 72 so that torquers 64, 65 will be without effect in torquing gimbal 41. Also, when valve 154 is in its normal position port 157 is connected through valve 154 to tank 19 through line 157b, and line 62 while port 157a is pressurized through valve 154 by line 60 connected to port 158 through line 159.

The purpose of restrictor 62' is merely to assure fluid pressure in lines 71, 72 under all operating conditions and thus compensate for oil leakage. Accordingly, low pressure line 157b is connected to lines 71, 72 through line 157b, check valves 157a, 157f and lines 157g and 157h respectively; and the free flow direction of check valve 157e and 157 is toward lines 71, 72 so that in the absence of pressure in lines 71, 72 these check valves will open to slightly pressurize lines 71, 72 with oil from low pressure line 157b; but oil cannot flow across lines 71, 72 through check valves 157e and 157f.

An elongated arm 160 is pivotally supported on piston rod 140 by a pin 161 and arm 160 extends upwardly through an opening 162 formed in cylindrical housing 133 between the disc-shaped plugs 138. A shaft 163 is mounted in journal blocks 164, 165 on housing 133 within opeing 162, with shaft 163 being supported for rotation about an axis extending at right angles to piston rod 140 and spaced therefrom. Arm 160 extends upwardly through and is slidably received in an opening 166 in shaft 163 so that axial movement of piston rod 140 will result in rod arm 160 being pivoted about its support pin 161 and simultaneously slid through the opening 166. This pivotal movement of arm 160 will also result in rotational movement of shaft 163 in response to any movement of rod 140.

A pulley 167 is mounted on the end of shaft 163 by key 167a and nut 167b, and cable 116 extends around the outer periphery of pulley 167 to be driven thereby upon rotation of shaft 163. As shown in FIGURES 4 and 9, the cable 116 also extends around fair-lead pulleys 168, 169, 117 and around follow-up pulley 115 of the differential drive mechanisms 78 so that any movement of the piston rod 140 in rate cylinder 127 will result in simultaneous rotation of shaft 97 of valve 56. This rotation of shaft 97 resulting from movement of piston rod 140 is employed to remove a differential pressure signal from control valve 56 as will be more fully explained below.

Referring again to FIGURES 3 and 4, the hydraulic spring 80 is employed to apply a torque to the gimbal about the gimbal axis and comprises a two-way fluid cylinder 170 having its head end pivotally mounted by pin 171 to a bracket 172 on an upright frame member 173. The piston rod 174 extending from the rod end of cylinder 170 has its free end pivotally connected to a pin 175 extending upwardly from the upper surface of the quadrant 79 which, in turn, is pivotally supported for free rotation about shaft 176. Shaft 176 is supported by a mounting bracket 177 rigidly mounted on member 32 at a point intermediate the cylinder pivot 171 and the rod pivot 175 so that movement of the piston 178 within the cylinder 170 in a direction to extend the rod 174 will rotate quadrant 79 in a direction to align pins 171, 175 and shaft 176. Conversely, movement of the piston 178 in a direction to retract the rod within cylinder 170 will rotate quadrant 79 in a direction to move pin 175 away from a line extending through pin 171 and shaft 176. To extend rod 174, fluid, under pressure, may be directed to the head chamber of the cylinder 170 through fluid inlet 179 connected by line 179a to line 179b. To retract rod 174 fluid under pressure may be directed to the rod chamber of the cylinder 170 through inlet 179c connected by line 179d to line 179e.

Cable 75 has its free ends fixed to quadrant 79 so that any precessional or angular movement of gimbal 41 acting through pulley 73 and cable 75, will pivot quadrant 79 about shaft 176 according to the direction and the amount gimbal 41 moves. Thus, when the gyro is precessed about its gimbal axis from its normal centered position, quadrant 79 will be pivoted to move pin 175 out of alignment with pin 171 and shaft 176. In this position, any differential fluid pressure to the ends of the cylinder 170 will tend to rotate the quadrant and apply a torque to the gyro gimbal. This torque will be a function of the angular displacement of quadrant 79 from the position corresponding to the gimbal center position in which pin 171, shaft 176 and pin 175 are aligned.

To support the vehicle 10 when the gyro is not operating, as when the vehicle is parked, or when the gyro is operating at a speed insufficient to stabilize the vehicle, a pair of outrigger parking wheels 180, 181 (FIGURES 2, 10–12) are provided one on each side of the vehicle adjacent the rear wheel 22. Since parking wheels 180, 181 and all their associated structure are identical, only wheel 180 and its associated structure will be described in detail, with corresponding parts for wheel 181 having identical reference numerals but being indicated with a prime (') mark.

The wheel 180 is journaled for rotation about stub axle 182 rigidly supported on the distal end of a support assembly 183. The support assembly 183 includes an elongated arm member 184 rigidly attached, as by welding, to a tubular bearing member 185 and a brace member 186 extends from bearing member 185 to arm 184 to add rigidity to the structure. The assembly is mounted for pivotal movement about a horizontal axis by a pin 187 extending through a rigid bracket member 188 supported on frame member 189. The pin 187 extends through the tubular bearing member 185 and an opening 190 in frame member 191. A pair of latching plates 192 having a plurality of ratchet teeth 193 formed thereon, are rigidly welded to support assembly 183 for pivotal movement therewith about pin 187.

A two-way fluid cylinder 194 has its head end pivotally mounted by a pin 195 to a rigid bracket 196 on frame element 191 and the free end of piston rod 197 is pivotally connected by pin 198 and sleeve 199 to latching plates 192. Fluid under pressure may be directed to the head chamber of fluid cylinder 194 through an inlet 200 connected through line 200a to line 51 to rotate the support assembly 183 about pin 187 to raise wheel 180 to the phantom line position shown in FIGURE 10. Fluid under pressure may also be directed to the rod chamber of cylinder 194 through inlet 201 connected to pressure line 60 by line 201a to force wheel 180 toward the lower position shown in full line in FIGURE 10.

To positively lock wheel 180 in the down position, a pawl 202 is supported on frame member 191 in position to engage ratchet teeth 193. The pawl 202 is mounted on the free end of a piston rod 203 and is urged into engagement with the ratchet teeth 193 by a coil spring 204 contained within the cylinder 205 and acting on a piston 206 carried on the end of rod 203. Fluid under pressure may be directed to the rod chamber of cylinder 205 through an inlet 207 connected to line 179e to overcome the spring force and thereby retract pawl 202 from engagement with ratchet teeth 193 to permit wheel 180 to be elevated. Pressure fluid may also be directed to the head chamber of cylinder 205 through inlet 209 connected to line 179b to assist spring 204 in holding pawl 202 in engagement with teeth 193. While teeth 193 are shaped to permit the assembly 183 to be moved down with the pawl 202 engaging teeth 193, pawl 202 must be retracted before the assembly can be raised. Pressure fluid from line 60 is directed to input port 158 of valve 154 by line 159.

Figure 14:
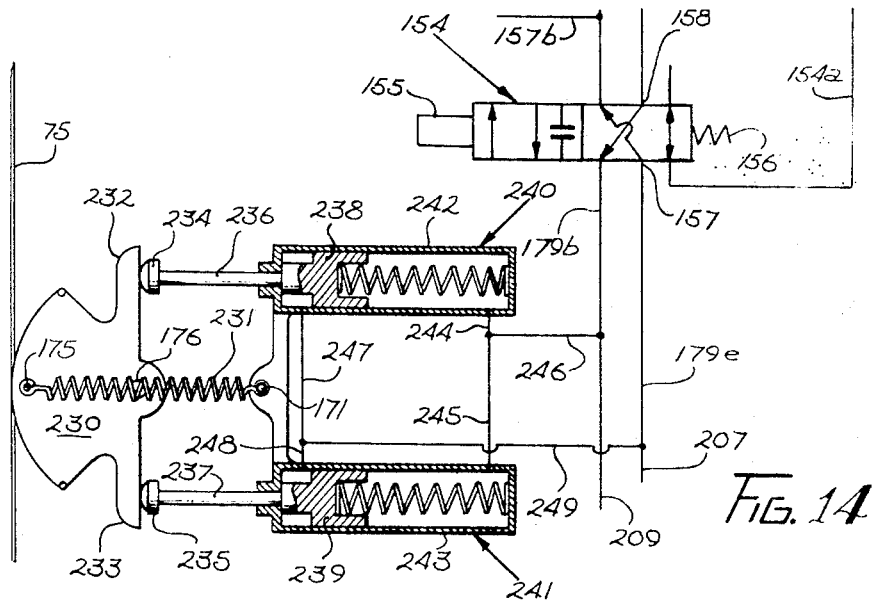
FIGURE 14 is a schematic of a portion of the hydraulic control system shown in FIGURE 13, and illustrating an alternate embodiment of the invention for torquing and caging the gyro, and shows the gyro in the caged position.
Figure 15:
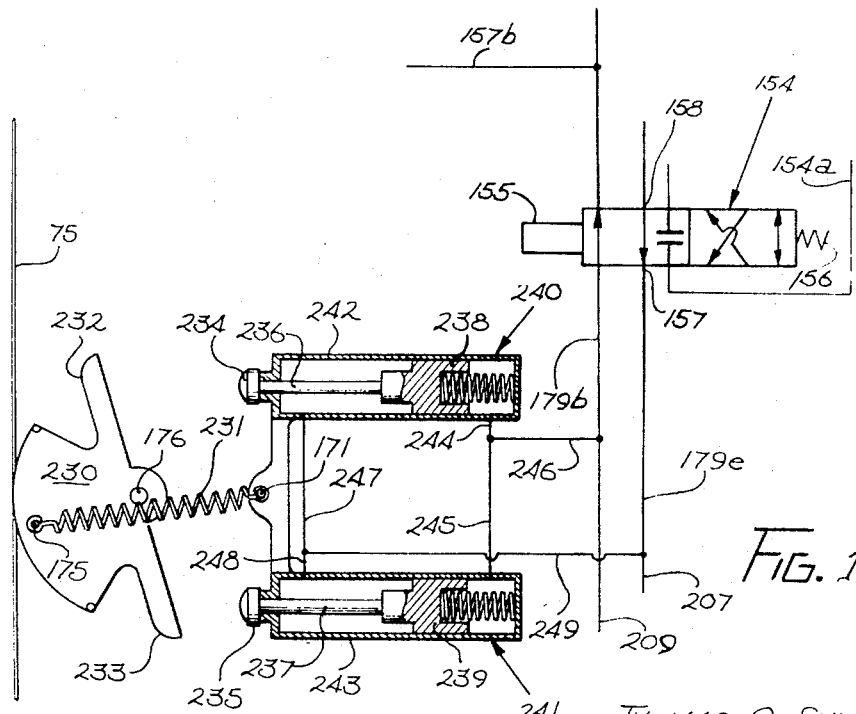
FIGURE 15 is a schematic of the alternate embodiment shown in FIGURE 14 with the gyro in the uncaged position.
Figure 16:
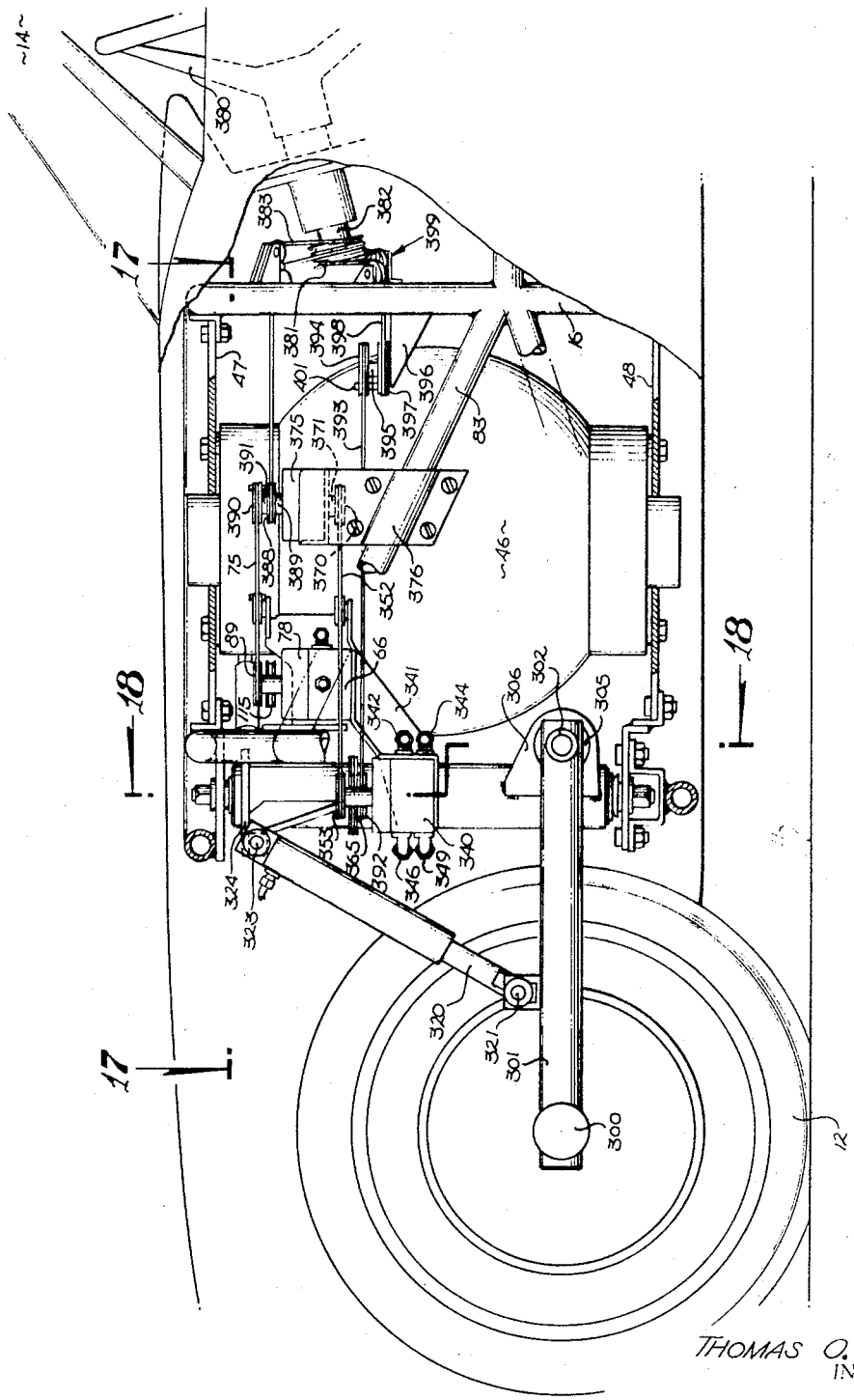
FIGURE 16 is a partial vertical section similar to FIGURE 4, and showing an alternate embodiment of the vehicle incorporating the novel gimbal steering arrangement of the invention.
Figure 17:
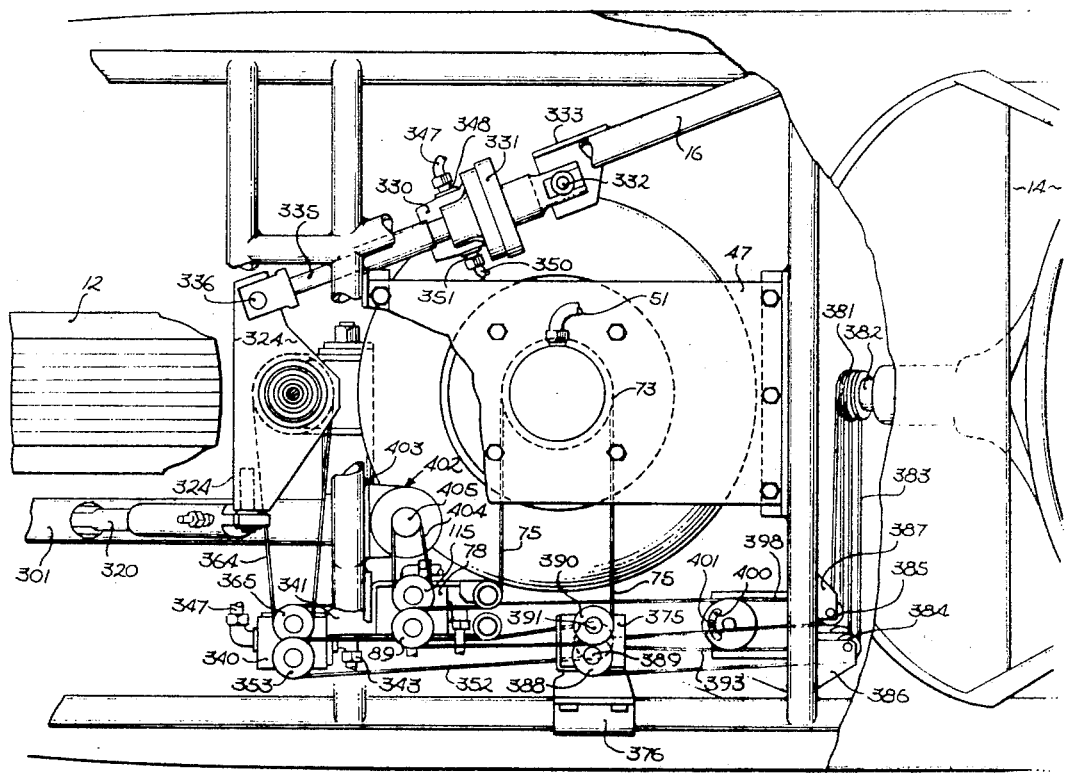
FIGURE 17 is a partial top plan view taken along line 17—17 of FIGURE 16 and further showing the gimbal steering mechanism.
Figure 18:
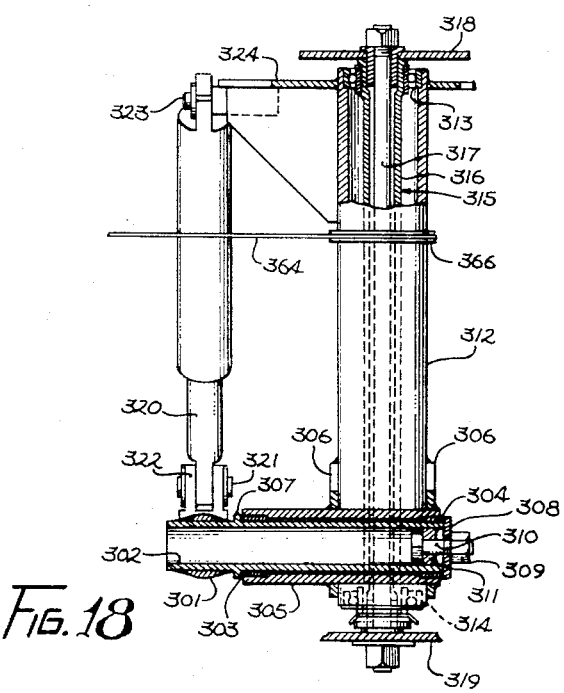
FIGURE 18 is a fragmentary sectional view taken along line 18—18 of FIGURE 16.

Instead of hydraulic spring 80, a conventional tension spring may be employed to torque the gyro. Referring now to FIGURES 14 and 15, in this alternate embodiment of torquing the gyro, cable 75 has its free ends fixed to a quadrant 230 instead of quadrant 79, and pin 175 is fixed to alternate quadrant 230 which is pivotally supported for free rotation about shaft 176. Instead of the head end of cylinder 170 being pivotally attached to pin 171, the stationary end of a conventional spring 231 is attached to pin 171 and the movable end of spring 231 to pin 175. When gimbal 41 is in its normal position, quadrant 230 will assume the position shown in FIGURE 14, in which position pin 175, shaft 176, and pin 171 are in alignment and the tension of spring 231 can produce no torque about the gimbal axis. When, however, the gimbal is displaced one way or the other from its normal position, quadrant 230 is displaced accordingly (see FIGURE 15) and the line of action of spring 231 moves away from the pivot axis of quadrant 230, causing spring 231 to produce torque about the gimbal axis, which gimbal torque is always in the direction the gimbal is displaced from its normal position.

In this alternate embodiment of torquing the gyro, provision is made also for caging or centering and holding the gyro in its normal position until valve 154 is shifted by pilot pressure. To this end, arms 232, 233 are integrally formed opposite each other on quadrant 230 to receive plungers 234, 235 on the protruding ends of parallel rods 236, 237 respectively. Rods 236, 237 are spaced one on each side of and are equidistant from the line of action of spring 231 when gimbal 41 is in its normal position. Pistons 238, 239 are affixed to rods 236, 237 opposite plungers 234, 235 so that rods 236, 237 may be retracted and extended by hydraulic motors 240, 241 in which pistons 238, 239 are housed in cylinders 242, 243 of motors 240, 241 firmly secured to the frame of the vehicle. When rods 236, 237 are extended, as in FIGURE 14, quadrant 230 is centered and gimbal 41 is caged or locked in its normal position, and when rods 236, 237 are retracted, as in FIGURE 15, quadrant 230 is released and gimbal 41 is, thus uncaged and free to pivot. To retract and extend rods 236, 237 the head chambers of hydraulic motors 240, 241 are connected to hydraulic line 179b by lines 244, 245, 246; and the rod chambers of hydraulic motors 240, 241 are connected to line 179e by lines 247, 248, 249, so that when pawl 202 is retracted as a result of hydraulic pressure in line 179e, rods 236, 237 retract simultaneously with pawl 202. Thus, when the wheels 180, 181 are released by pawls 202, 202', gimbal 41 will uncage simultaneously.

Referring now to the schematic drawing shown in FIGURE 13, the operation of the hydraulic control system employed in the illustrated embodiment of the invention will be described in detail.

When the engine 21 is started, pump 20 pressurizes line 51 and motor 50 with oil drawn from reservoir 19. The head chambers of cylinders 194, 194' are also pressurized since they are connected through line 200a to line 51. Because of the large moment of inertia of gyro rotor 38, some time is required for motor 50 to attain its maximum operating speed and during this time pump 20 maintains a constant output pressure by varying its output volume according to the demands of motor 50. Oil exhausted from motor 50 enters valve 56 through input port 58 and returns to tank 19 through return port 59, line 60, restrictor 61 in line 60, line 62 and restrictor 62' in line 62.

When the pump and motor are operating normally, one end of line 60 is under greater pressure than the other, due to pressure drop across restrictor 61. The pressure in the upstream end of line 60 is, of course, a function of the rate oil is pumped through the return lines to the reservoir and the resistance the oil encounters enroute from the upstream end of line 60 to reservoir 19. This pressure in the upstream end of line 60 is due largely to restrictor 61 and to a lesser extent to restrictor 62' which is sized to offer much less resistance to a given fluid flow, and this upstream pressure increases as a function of the rate oil is pumped through gyro motor 50. In other words, the pressure in the upstream end of line 60 is at all times a function of the rate at which gyro rotor 38 is spinning. When line 60 is under pressure the rod chambers of cylinders 194, 194' are also pressurized since they are connected to line 60.

When the engine stops running, the pressure in line 51 and the pressure in the head chambers of cylinders 194, 194' falls off almost instantly, but motor 50 continues to revolve because of the large moment of inertia of gyro rotor 38. Hydraulic motor 50 then serves as a pump and the gravity head pressure of reservoir 19 opens check valve 63, normally held closed by pump pressure in line 51, so that motor 50 pumps oil from tank 19 into valve 56 through input port 58, and returns oil to tank 19 through return port 59, line 60, restrictor 61 and line 62, as though the engine were running.

The size of restrictor 61 and the flow rate through it, largely determines the pressure in line 60, and therefore the pressure in the rod chambers of cylinders 194, 194'. The pressure in line 60, however, is less than in line 51 when the engine is driving motor 50 through pump 20, since restrictor 61 is downstream from line 51. Accordingly, the head pressure in cylinders 194, 194' is greater than the rod pressure. Also, the area on the head side of the pistons in cylinders 194, 194' is greater than on the rod side.

Thus, when the engine 21 and pump 20 are driving motor 50, wheels 180, 181 are urged upward, but when the engine stops running and the pressure in line 51 falls off, wheels 180, 181 are urged downward by pressure in line 60 which continues until the gyro rotor 38 stops spinning. Such motivation of the parking gear, however, does not occur unless the gear is unlocked by piston operated pawls 202, 202'. These pawls, or detents, normally lock the gear in the down position by the pressure of springs 204, 204' and to unlock the gear, the rod chamber of each cylinder 205, 205' must be pressurized sufficiently to overcome the spring pressure. It is important that the parking gear not unlock until the gyro is near its normal operating speed so that the vehicle can stabilize when the parking wheels are retracted.

This is assured by valve 154, which connects the rod chambers of cylinders 205, 205' to the high pressure side of line 60 and the head chambers of cylinders 205, 205' to the low pressure side of line 60, to withdraw pawls 202, 202' when, and only when gyro rotor speed and the associated pressure in line 60 pressurizes pilot 155 sufficiently to actuate valve 154 against predetermined resistance of spring 156.

When the engine stops and pump pressure is lost, pawls 202, 202' remain retracted, nevertheless, until the gyro runs down sufficiently for spring 156 to overcome pilot 155 and shift valve 154 to its normal position, or the position assumed by the valve when the pressure in line 60 drops below a predetermined value. When pump pressure in line 51 is lost, therefore, pawls 202, 202' allow the wheels to be moved down immediately by pressure through line 201a from the upstream side of line 60, and some time later when the gyro has run down sufficiently for valve 154 to shift to its normal position, pawls 202, 202' lock the wheels in the down position by spring pressure.

Thus, it becomes apparent that when the engine stops running the parking wheels lower immediately but will not lock until the gyro speed falls below a predetermined value at which valve 154 will shift the spring pressure to its normal position. It is further apparent that when the engine is started the wheels will not unlock and rise until the gyro reaches a predetermined speed at which the valve 154 is shifted by hydraulic pressure to the position shown in FIGURE 13. The actuating pressure of the valve 154 and the corresponding gyro rotor speed is therefore set at a value at which the angular momentum of the gyro will be sufficient to stabilize the vehicle when the parking wheels are retracted. When the parking wheels are retracted it is also important that the rate cylinder 127 develop a rate responsive torque about the axis of the gyro gimbal in a direction and of sufficient magnitude to stabilize the vehicle. The function of the rate cylinder 127 in stabilizing the vehicle will now be described.

Upon precession of the gimbal 41 in the direction of arrow 124, for example, the cable 75 will rotate pulley 89 and move valve 56 in a direction to connect pressure port 58 directly to port 122, and port 123 to return port 59, so that piston 141 will move toward head 134 and piston 142 will move away from head 134a. Such movement of pistons 141, 142 transfers oil from chamber 149 to chamber 151 through restrictor 152 connecting lines 71, 72.

Figure 13:
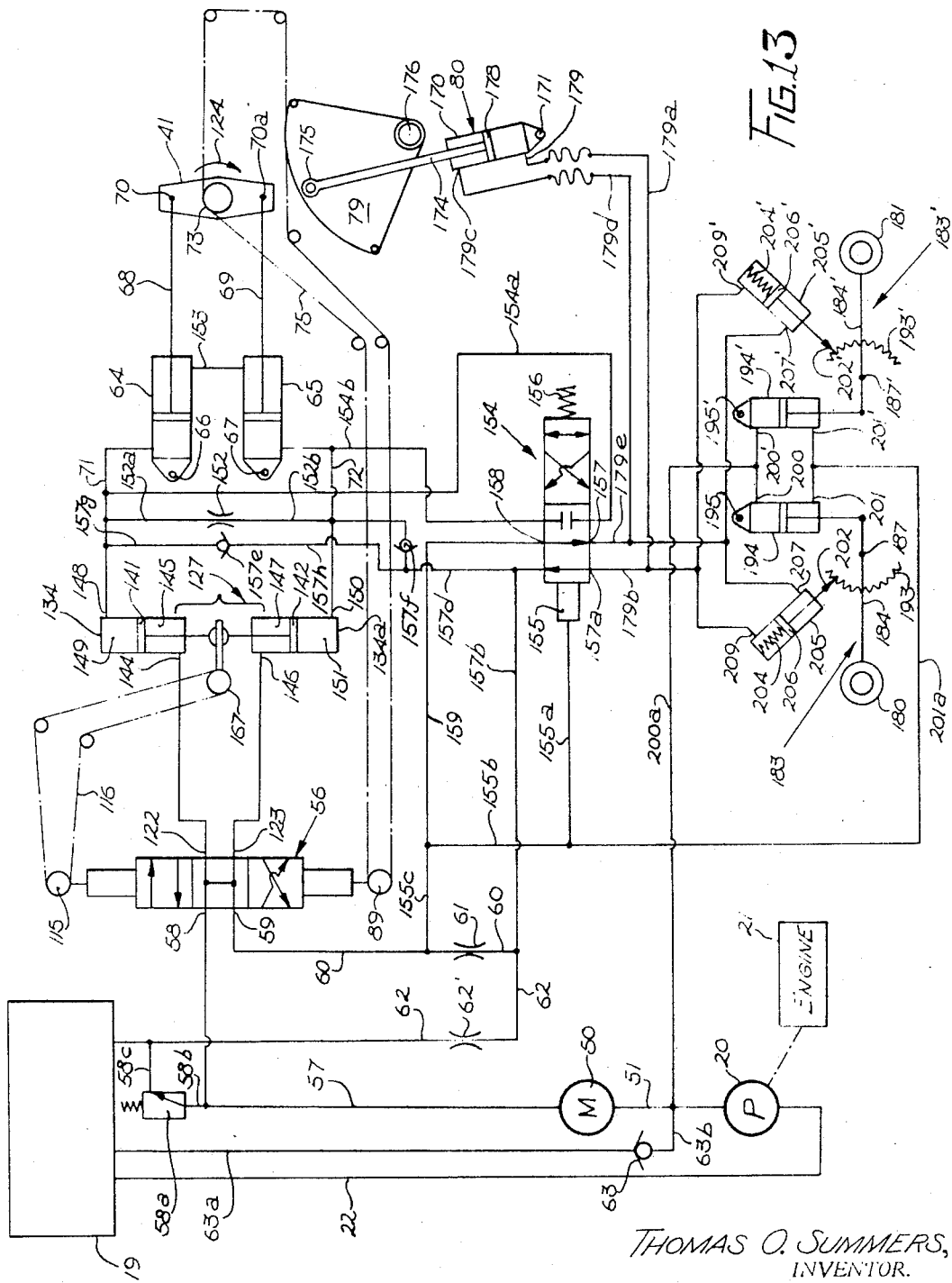
FIGURE 13 is a schematic of the hydraulic control system for the vehicle.

When the parking wheels 180, 181 are retracted valve 154 is in the position shown in FIGURE 13, in which position it blocks oil flow through lines 154a, 154b across lines 71, 72. Therefore, when piston 141 moves toward head 134, oil is forced through restrictor 152 which affords flow resistance as a function of the gate at which piston 141 moves toward head 134. Thus, pressure is developed in line 71 that is greater than the pressure in line 72 with the result that the head chamber of torquing cylinder 64 connected to line 71 is pressurized to a greater extent than is the head chamber of cylinder 65 connected to line 72. As a result of this movement of the piston 141, 142, pulley 167 moves cable 116 and rotates follow-up pulley 115 in a direction to return valve 56 back toward its normally open position.

As long as gimbal 41 is moving appreciably in the direction of arrow 124, however, and is rotating pulley 89, follow-up pulley 115 will lag behind pulley 89 with the result that port 122 will remain energized and piston 141 will continue to move toward head 134. When gimbal 41 and pulley 89 stop moving, however, the valve 56 will be returned immediately to its open position by follow-up pulley 115 and pistons 141, 142 will also stop moving in a position appropriate to the displacement of gimbal 41. Should gimbal 41 move in a direction opposite to the arrow 124, the reverse action will, of course, occur and the head pressure in torquer 65 will be greater than the head pressure in torquer 62. Thus, the pistons 141, 142 follow the movement of gimbal 41 and cause a torque to develop about the axis of gimbal 41 that is a function of the rate and direction the gimbal precesses.

In accordance with the laws of precession, as long as the vehicle is perfectly free to precess about its roll axis, the gimbal will not precess in response to gimbal torque because the gyro will resist such a torque by roll precession at a rate and in a direction corresponding to gimbal movement; nor will the vehicle precess about its roll axis in response to a disturbing roll movement, because the gyro will resist such a roll moment by gimbal precession at a rate and in a direction corresponding to the roll moment.

Thus, the vehicle is banked only by the application of gimbal torque, and the gimbal is displaced only by the application of roll torque.

Accordingly, when the vehicle is disturbed in roll from its normal position of unstable equilibrium, the resulting roll moment does not roll or precess the vehicle appreciably. Rather, the disturbing roll moment is resisted by gimbal precession according to the rate and direction of the roll moment. Such gimbal precession is followed by the pistons in the rate cylinder. This causes gimbal torque according to the direction and rate the gimbal is precessed by the roll moment, which torque precesses or banks the vehicle in a direction opposite to the direction of the disturbing torque; or in other words, back toward its equilibrium position, until the gimbal stops precessing and equilibrium is restored.

Thus, in the event of a disturbing torque or a change in equilibrium position of the vehicle about its roll axis, the gyro provides the vehicle with short term stability while rate cylinder 127 generates gimbal torque in a direction to precess or roll the vehicle back toward its equilibrium position; and, as the vehicle thus approaches its equilibrium position, the gimbal precession rate decelerates accordingly until roll equilibrium is manifested by cessation of gimbal precession.

Upon a disturbance of the vehicle about its roll axis, it is important that the rate cylinder be sufficiently powered to bank the vehicle into its equilibrium position before the gyro gimbal has time to precess excessively from its normal position to a hard over position at which the gyro is no longer effective in resisting roll disturbances.

To this end, the pump 20, driven by engine 21, supplies fluid power to operate the rate cylinder 127, and in the event the engine 21 accidentally stops or loses power, motor 50, driven by kinetic energy, acts as a pump and supplies fluid power for a short period.

Neglecting for the time being, friction and other sources of error, the classical gyro registers the time integral of moments applied about one precession axis with a proportional displacement about the other precession axis. Accordingly, upon roll disturbances, gimbal displacement is proportional to the time integral of the disturbing roll moments and roll equilibrium is restored by applying force moments about the gimbal axis. Restoration of roll equilibrium occurs, of course, when the time integral of applied rate sensitive gimbal moments equals the time integral of disturbing roll moments. It might appear, therefore, that roll equilibrium can only occur and that gimbal precession can only cease when the gimbal returns to its original or normal position.

Such is not the case, however, because of integration errors due largely to gimbal bearing friction, and the gimbal may drift considerably from its normal position after only a few minutes of operation. The purpose of the hydraulic gimbal torquing spring 80 and the alternate conventional tension spring 231 is to correct such drift or erase such integration errors as they occur so that the gimbal will always be maintained in the vicinity of its normal position.

Referring to the alternate embodiment shown in FIGURES 14 and 15 of a spring operated torquing device, the operation of this simple spring in torquing the gimbal will first be described.

When the gimbal is in its normal position spring 231 produces no torque about the gimbal axis, but when the gimbal becomes displaced from its normal position, the line of action of the spring becomes displaced from shaft 176 with the result that the gimbal is torqued as a function of, and in the direction of, gimbal displacement. This gimbal torque, unlike the gimbal torque due to rate cylinder 127, is not a function of rate and, therefore, does not restore the roll equilibrium of the vehicle as does the rate sensitive gimbal torque. In contrast, this spring torque actually precesses or banks the vehicle, and is in a direction to precess the gimbal back toward its normal position. Such a spring, however, is without effect in restoring equilibrium so that even though the gimbal were returned to its normal position by spring 231 the gimbal would go right on precessing past its normal position except for the application of the rate sensitive gimbal torque which opposes the displacement sensitive gimbal torque.

One adverse effect of the spring 231 is to cause the gimbal to oscillate about its normal position, but the frequency and amplitude of this oscillation reduces to an insignificant value if the spring torque is no greater than necessary to overcome gyro drift and maintain the gimbal in the vicinity of its normal position under various operating conditions.

The hydraulic spring 80 serves the same function as alternate spring 231, the purpose of both springs being to maintain the gimbal in its normal position. Hydraulic spring 80, however, can be reversed when the parking gear is down and the vehicle is without freedom of roll. Under these circumstances, the gimbal moves in whichever direction it is torqued and reversing the direction of the force exerted by the hydraulic spring assures that the gimbal will center when the parking gear is down. On the other hand, in the alternate embodiment for torquing the gimbal, the spring torque cannot be reversed, and it is necessary to cage the gimbal to its normal position when the parking gear is down, as shown in FIGURE 14. Such caging of the gimbal is effected by pressurizing hydraulic line 179b with pressure from port 158 of valve 154 and by connecting line 179e to low pressure line 157b.

Reversal of the hydraulic spring 80 is effected in a similar manner by pressure from port 158 and by connecting line 179e to low pressure line 157b. Such caging or such reversal of the hydraulic spring 80 is effected in both instances by the shifting of valve 154. In both spring torquing embodiments, whenever the valve 154 shifts to its normal position (the position shown in FIGURE 14), the gimbal will be positioned in its center positon and since port 207 is connected to low pressure line 179e and port 209 is connected to high pressure line 179b the wheels will be locked simultaneously in the down position by pawl 202, 202' by pressure from springs 204, 204' and also by pressure from line 179b.

Referring now to FIGURES 16–19 of the drawings, an alternate embodiment of the invention will be described, in which embodiment the rate responsive gimbal torquing system described above is augmented by a novel adaptation of gimbal steering. In this embodiment the basic vehicle, including the gyro and many of the components of the control system are identical to that described above and the description thereof will not be repeated here. Further, reference numerals for like parts will not be changed.

The vehicle's front wheel 12 is mounted on a horizontal stub axle 300 rigidly supported, as by welding, on the forward end of an elongated arm 301 which, in turn, is rigidly mounted, as by welding, to a laterally extending horizontal tubular shaft 302. Shaft 302 is pivotally mounted for rotation about a horizontal axis by bearings 303, 304 supported in a sleeve 305 which, in turn, is rigidly mounted, as by welding on brackets 306. The shaft 302 is supported against axial movement in sleeve 305 by a shoulder 307 engaging bearing 303 and by a washer 308 engaging bearing 304. Washer 308 is retained on the end of sleeve 302 by a nut 309 on a bolt 310 extending through a plug 311 rigidly supported, as by welding, in the end of shaft 302.

The brackets 306 are rigidly supported, as by welding, by a cylindrical sleeve 312 supported for pivotal movement about a vertical axis by bearings 313, 314 mounted on the lower and upper ends, respectively, of the vertical shaft assembly 315. The shaft assembly 315 includes a tubular sleeve 316 supported on frame 16 by an elongated tie bolt 317 extending through an upper rigid mounting bracket 318 and a lower mounting bracket 319. Thus, front wheel 12 is supported for pivotal movement about the horizontal axis of tubular shaft 302, and for pivotal movement about the vertical axis of sleeve 312.

To limit the vertical movement of wheel 12 about the horizontal pivot axis, a combination spring and shock absorbing cylinder 320 has one end pivotally mounted, as by pin 321 extending through a bracket 322 on arm 301, and its other end pivotally supported by a pin 323 rigidly mounted on a bracket 324 on sleeve 312.

The vehicle support mechanism, described above, provides substantial negative caster for the front wheel so that any movement of the front wheel about the vertical axis of sleeve 312 will laterally shift the vehicle center of gravity with respect to the roll axis of the vehicle defined by the points of contact of the two wheels of the vehicle with the suuporting surface 11.

The front wheel 12 is steered by a reversable hydraulic gear type steering motor 330 mounted on a gear transmission 331 which, in turn, is pivotally supported by a pin 332 on a bracket 333 rigidly mounted to frame 16. Operation of the hydraulic motor 330, acting through the gear train of transmission 331, reciprocates an elongated connecting rod 335 projecting from transmission 331. The connecting rod 335 has its distal end pivotally connected, as by pin 336, to the bracket 324 on the vertical sleeve 312 so that operation of the fluid motor 330 will steer the vehicle wheel 12.

The specific structure of the hydraulic motor 330 and the gear transmission 331 are conventional and as such form no part of the invention. Indeed, it is contemplated that a linear two-way fluid motor, or cylinder, extending between pin 332 on bracket 333 and pin 336 on bracket 324 could be employed to steer the vehicle.

Operation of the fluid motor 330 is controlled by a rotary open center, four-way control valve 340 supported, as by bracket 341, on frame 16. Fluid, under pressure, is directed to valve 340 through inlet port 342 connected to pressure line 343 and returned to tank 19 through outlet port 344 connected to line 345. Fluid is directed from valve 340 through outlet port 346 and line 347 to inlet port 348 of motor 330, or through outlet port 349 and line 350 to port 351 in motor 330, depending upon the position of the control valve 340. The position of valve 340 is controlled by a cable 352 extending over a pulley 353 mounted on one end of the rotary shaft of valve 340, and by a second cable 364 extending over a pulley 365 operatively connected to the opposite end of the shaft of the valve 340. The cable 364 extends from pulley 365 around a pulley 366 mounted on sleeve 312 for rotation therewith, so that any rotational movement of the sleeve 312 due to steering movement of the wheel 12 will result in cable 364 driving pulley 365 to position the valve 340. This follow-up connection between the control valve 340 and the steered wheel 12 of the vehicle is employed to remove a steering wheel 12 of the vehicle is employed to remove a steering signal placed on the valve 340 by the cable 352.

The control cable 352 extends from pulley 353 on valve 340 to a pulley 370 rotatably fixed on the output shaft 371 of a differential drive mechanism 375 supported on frame 16 by bracket 376. The structure and operation of the differential drive mechanism of 375 is identical to the differential drive mechanism 78 described in detail herein above and, accordingly, differential 375 will not be described in detail.

A manually controlled steering wheel 380 is mounted in the passenger compartment 14 of the vehicle in a conventional manner, and a pulley 381 is mounted on steering column 382 for rotation by the steering wheel 380. A cable 383 extends over fair-lead pulleys 384, 385 supported on brackets 386, 387, respectively and around pulley 388 on input shaft 389 of differential drive 375. Also, the control cable 75, which extends around and is driven by the pulley 73 mounted for rotation with the gyro gimbal, extends over pulley 390 mounted on input shaft 391 of the differential drive mechanism so that shaft 391 is rotated by the cable 75 upon precessional movement of the gyro about its gimbal axis.

Thus, the position of the output shaft 371 of differential drive 375 is influenced by two input signals; one signal resulting from movement of the manually controlled steering wheel 380 which directly positions input shaft 389, and the other by precessional movement of the gyro gimbal which positions shaft 391. Any movement of either the steering wheel 380 or of the gyro gimbal 41 which is not accompanied by simultaneous movement of the other in a direction and in an amount to erase the effect of such movement on the differential drive mechanism 375 will result in the output shaft 371 being rotated to drive cable 352 to shift the position of the rotary control valve 340 and thereby direct pressure fluid through the hydraulic motor 330 to steer the vehicle in a direction depending upon the direction of movement of the valve 340.

A pulley 392 is rotatably fixed on the shaft of valve 340 for rotation with follow-up pulley 365, and a cable 393 extends over pulley 392 and around a pulley 394 rotatably supported on a shaft 395 mounted on a bracket 396 on frame 16. A second pulley 397 is rotatably mounted on shaft 395 and a cable 398 extends from pulley 397 over a suitable fair-lead pulley 399 and around pulley 381 on steering wheel 380. Pulley 397 has an elongated arcuate slot 400 framed therein adjacent to its outer periphery, and a pin 401 extends through slot 400 and is rigidly mounted on pulley 394 in axial alignment with slot 400. Thus, while pulley 394 and 397 are each freely rotatable on shaft 395, pin 401 will engage the ends of slot 400 to limit the extent of relative movement between these pulleys.

The pulley 394 is caused to follow the position of steered wheel 12 by cables 393 and 364. At the same time cable 398 drives pulley 397 to follow the position of the vehicle's steering wheel 380. However, the pin 401 on pulley 394 cooperates with slot 400 to limit relative movement between these two pulleys and thereby limit the extent to which the vehicle's steering wheel may be rotated to lead or lag the steering movement of the steered wheel. This limits the extent to which pulley 388 may be rotated with respect to pulley 390 to bias the null position between the gyro and the steered wheel.

Operation of the steering motor 330 will steer the vehicle wheel 12 and result in the pulley 366 driving cable 364 in a direction to rotate pulley 365 to erase the steering signal from valve 340. Thus, when wheel 12 has been steered an amount corresponding to the signal received from differential drive 375, the steering movement of wheel 12 will be stopped and the wheel will be retained in this position until a further signal is received at the control valve 340.

In this embodiment, or modification, of the vehicle, the control valve 56, and the differential drive 78 therefor, are mounted on the bracket 341 forward of the differential drive 375. The structure and operation of the valve 56 and the differential drive 78 are described above and, accordingly, will not again be described here. In this embodiment, however, the rate cylinder 127 has been replaced by a rotary gear type motor-pump assembly 400 mounted on frame 16 by bracket 401. A follow-up cable 402 extends around follow-up pulley 115 on differential drive 78 and a pulley 403 on the motor-pump assembly 400 to remove a signal from the valve 56 upon rotational movement of the motor and pump assembly in the same manner that the signal was removed from the valve 56 by movement of cable 116 in the previously described embodiment.

As illustrated in the hydraulic schematic shown in FIG. 19, the motor-pump assembly 400 is essentially a gear type rotary hydraulic motor 410 and a separate gear type rotary hydraulic pump 411 mounted on a common shaft illustrated by the broken line 412. Port 122 of valve 56 is connected to motor 410 through pressure line 413 and port 414, and port 123 is connected through line 415 to port 416 of motor 410. Thus, fluid flowing from valve 56 through port 122 will enter motor 410 through port 414 to drive the motor in one direction, with the fluid being discharged from the motor through port 416 and returning to the valve 56 through port 123. Conversely, when the valve 56 is positioned to direct fluid through port 123 to the motor 410, the motor will be driven in the opposite direction and fluid will be discharged from the motor and returned to the valve through port 122.

Rotation of motor 410 will drive the pump 411 to pump fluid through port 420 or port 421 therein, depending upon the direction of rotation of the pump. Port 420 in pump 411 is connected to line 422 to provide fluid communication between port 420 and the head chamber of torquing cylinder 64, and port 421 of pump 411 is connected to line 423 to provide fluid communication between the pump 411 and the head chamber of torquing cylinder 65. Fluid communication between the ports 420 and 421 across a line restrictor 425 is provided by line 426 connecting lines 422 and 423, respectively, to opposite sides of the restrictor. The rod end of torquing cylinder 64 is connected through line 427 to port 428 of an open center, four-way rotary valve 429, and the rod end of torquing cylinder 65 is connected through line 430 to port 431 of valve 429. Pressure fluid is directed to the inlet port 432 of valve 429 through pressure line 433 and returned to the system through exhaust port 434 and line 435.

Valve 429 is connected directly to the gyro gimbal 41 for rotation thereby so that, upon any precessional movement of the gyro from its normal centered position, the valve 429 will be positioned to direct pressure fluid to the rod end of the appropriate torquing cylinder 64, 65 to thereby apply a torque about the gimbal axis of the gyro in a direction to return the gyro to its centered position in the manner described hereinabove. Thus, the rod ends of torquing cylinders 64, 65 have been employed to replace the hydraulic spring of the displacement responsive torquing system of the first described embodiment.

As in the first described embodiment, the pressure fluid to this displacement responsive gimbal torquing system, i.e., the rod ends of the torquing cylinders, is reversed by the valve 154 when the pressure in the system drops below a predetermined minimum and the outrigger parking wheels are locked in the down position. This is accomplished by reversing the flow to the valve 429 so that pressure fluid is supplied to the valve through line 435 and port 434 and returned to the system through port 432 and pressure line 433.

Still referring to the schematic drawing shown in FIG. 19, the operation of the hydraulic control system employed in this alternate embodiment of the invention will be described in detail.

As in the previously described embodiments, when the engine 21 is started, the pump 20 pressurizes line 51 and motor 50 with oil drawn from reservoir 19 through line 22. Pressurization of line 51 pressurizes the head end of cylinders 194, 194' but, as previously described, wheels 180 and 181 will not be raised until the valve 154 is shifted to connect the rod chambers of cylinders 205, 205' to the high pressure side of line 60 and the head chambers of cylinders 205, 205' to the low pressure side of line 60. Valve 154 will be shifted from its normal position to the operating position shown in FIG. 19 by the pressure actuated pilot 155 only when motor 50 is near its normal operating speed and the pressure in line 356, connected to discharge line 345 of valve 340, is sufficient to actuate the valve 154 against the predetermined resistance of spring 156. Pressure is developed in line 356 as a result of a flow restrictor 62 between line 345 and tank 19.

When the gyro has attained its predetermined minimum operating speed at which it has sufficient angular momentum to stabilize the vehicle, the valve 154 is move to the position shown in FIG. 19, and the parking wheels are retracted by connecting the rod end of cylinders 205, 205' to the high pressure side of line restricter 61 in line 60 and the head end of the cylinders 205, 205' to the low pressure side of the line restrictor in line 60. At the same time, port 432 of valve 429 is connected to the high pressure side of line 60 through line 179e, valve 154, and line 159, and port 434 of valve 429 is connected to the low pressure side of the line 60 through line 435, the line 179b, valve 154, and line 157b.

The fluid discharge from the motor 50 is directed through line 57 to port 58 and is returned through port 59 and line 60 to the system. Upon precession of the gimbal 41 in the direction of arrow 124, for example, the cable 75 will rotate the pulley 89 on valve 56 in a direction to position valve 56 to connect pressure port 58 directly with port 122, and port 123 to return port 59, so that motor 410 and pump 411 will be driven by the fluid discharged from motor 50 in a direction to cause a flow of pressure fluid from pump 411 through port 420 and line 422. This fluid is caused to flow across restrictor 425 in line 426 to transfer oil from line 422 to line 423. The restrictor 425 affords a flow resistance which is a function of the rate at which the pump 411 is driven to transfer oil between lines 422 and 423. Thus, pressure is developed in line 422 that is greater than the pressure in line 423, which pressure differential is, therefore a function of the rate at which the pump is operated. This increase in pressure in line 422 results in the head chamber of torquing cylinder 64 being pressurized to an extent greater than the head chamber of cylinder 65 to apply a torque to the gyro in the direction of arrow 124.

The hydraulic system between the pump 411 and the torquing cylinders 64 and 65 is essentially a closed loop. Accordingly, to assure that the loop remains filled with fluid, and to make up any fluid lost due to leakage or other causes, means are provided to supply make up fluid to the loop. This is accomplished by connecting line 422 to fluid line 63a through line 436, and line 423 to line 63a through line 437. Ball check valves 438, 439 are installed in lines 436, 437, respectively, to permit flow into the closed loop and to prevent flow out of the loop.

Operation of motor 410 will drive cable 116 to rotate the follow-up pulley 115 in a direction to return valve 56 back toward its normal open center position illustrated in the drawing. As long as the gimbal 41 is moving the direction of arrow 124, however, and is rotating pulley 89, the follow-up pulley 115 will lag behind pulley 89 with the result that port 122 will remain energized and motor 410 will continue to drive pump 411. When gimbal 41, and consequently pulley 89, stop moving, the valve 56 will immediately be returned to its open center position by the follow-up pulley 115, and the motor 410 will be de-energized. As in the previously described embodiments, should the gimbal 41 move in a direction opposite to that indicated by arrow 124, the motor 410 and pump 411 will be driven in the opposite direction to apply a pressure to the head end of torquing cylinder 65 which is greater than the pressure in the head end of torquing cylinder 64. Thus pump 411 follows the movement of gimbal 41 and causes torque to be applied about the axis of the gimbal, which torque is a function of the rate at which the gimbal is precessing, and is in the same direction that the gimbal is precessing.

Any movement of the gimbal 41 from its centered position illustrated in FIGURE 19 will position valve 429 to direct pressure fluid to the rod end of cylinder 64 or 65, depending upon the direction in which the gimbal 41 is displaced from its centered position. This is accomplished through a direct linkage, illustrated by the broken line 450 etxending between the gimbal 41 and the pilot 451 of valve 429. This linkage is such that, unpon displacement of the gimbal 41 from its normal centered position in the direction of arrow 124, port 432 of valve 429 will be placed in fluid communication with port 431 and port 428 will be placed in communication with port 434. Fluid from the high pressure side of the flow restrictor 61 in line 60 will then be directed to the rod end of cylinder 65, and the fluid from the low pressure side of restrictor 61 will be directed to the rod end of cylinder 64. Thus, a pressure differential is applied between the rod ends of cylinders 64, 65, which pressure differential is equal to the pressure drop across flow resistor 61 in line 60, and which pressure differential is in a direction to apply a torque to the gimbal 41 in the direction in which it is displaced from its normal centered position. However, when the engine 21 is stopped, and the gyro has dropped below a predetermined minimum speed so that valve 154 is shifted to its normal position, the high pressure side of line 60 is connected to port 434 of valve 429, and the torque applied by the pressure differential between the rod ends of torquing cylinders 64 and 65 will be in the opposite direction to that in which the gimbal is displaced from its normal centered position. Under this condition, however, the parking wheels 180, 181 are lowered and locked into position so that the vehicle no longer has roll freedom about its longitudinal roll axis.

Movement of the gimbal 41 about its precession axis will drive cable 75 to thereby rotate pulley 390 of differential drive 375. Rotation of pulley 390 will result in simultaneous rotation of one of both the pulleys 370 and 388, depending upon the resistance to rotation of these pulleys. The inertial and frictional resistance to rotation of the steering wheel 380 and the associated linkage mechanism is preferably greater than the resistance of the rotary valve 340, so that pulley 370 will be rotated to drive cable 352 and pulley 353 to shift valve 340 from its normal open center position illustrated in FIGURE 19.

With the gyro located in its preferred orientation as described above and driven in a direction opposite to the direction of rotation of the vehicle wheels for forward motion so that the vehicle underbanks in a turn, a disturbing moment on the vehicle such as might be caused by a heavy person shifting his weight to the left (as viewed from the rear of the vehicle), will cause the gimbal to precess in the direction of arrow 124. Even though the driver holds steering wheel 380 stationary, this precession of the gyro, acting through differential drive 375, will shift the valve 340 to direct pressure fluid from line 343 to the appropriate side of steering motor 330 to project connecting rod 355 and thereby stear the vehicle wheel 12 to the left as viewed from the rear of the vehicle. Due to the negative caster of the front wheel, this steering action will laterially shift the center of gravity of the vehicle in a direction to equalize the unbalance torque, and re-establish roll equilibrium. Simultaneously, of course, the rate responsive torquing system applies a gimbal torque to roll precess the vehicle in a direction to agument the stabilizing action of the gimbal steering.

Movement of the steering motor 330, acting through cable 364 and follow-up pulley 365 on valve 340, tends to recenter the valve 340; however, so long as the gyro gimbal 41 is precessing, the movement of follow-up pulley 365 will lag the movement of pulley 353 and steering motor 330 will continue to rotate wheel 12 about the vertical axis of sleeve 312. When roll equilibrium is established and gimbal 41 stops precessing, follow-up pulley 365 immediately returns valve 340 to its centered position, de-energizing steering motor 330.

However, the steering wheel 380, acting through pulley 388 of differential drive 375, may be employed to manually bias the null position of the steered front wheel relative to the normal position of the gimbal so that the position of the steered front wheel does not always follow the position of the gyro gimbal in a fixed relation. For example, when a disturbing roll moment is applied to the vehicle as described above to produce precession of the gimbal 41 in the direction of arrow 124, steering wheel 380 could be manually controlled to erase all or a part of the signal received from the gyro by the differential drive mechanism during which time the center of gravity of the vehicle would not be shifted laterally by the negative caster of the steered front wheel in an amount sufficient to maintain roll equilibrium of the vehicle. In this case, the rate responsive gyro torquing mechanism would nevertheless, the effective to roll the vehicle into its equilibrium position so that stability of the vehicle would be maintained. It is understood, of course, that even with the steering wheel 380 maintained in a fixed position, the rate responsive torquing system will augment the roll torque on the vehicle due to gimbal steering. However, as stated above, due to the direct and consequently faster action of gimbal steering in producing equilibrating roll torque, very little bank or roll precession will have time to occur when the two systems operate simultaneously.

When in motion, the vehicle may be steered by rotation of the manually controlled steering wheel 380 in the conventional manner for steered wheeled vehicles. This results in the pulley 370 on the output shaft of the differential drive mechanism 375 positioning the valve 340 to steer the front wheel in a direction determined by the direction of rotation of the manually controlled steering wheel 380. Turning the steering wheel causes the vehicle to turn before it banks, and as a result of the turn, two disturbing roll moments are applied to the vehicle; one, a roll moment due to centrifugal inertial force, and the other a roll moment due to the lateral shift of the center of gravity of the vehicle resulting from negative caster of the steered front wheel of the vehicle. These roll moments precess the gyro gimbal, causing automatic application of the rate responsive gimbal torque which coordinates the turn by precessing or rolling the vehicle into its equilibrium position.

Although the relationship between the gimbal and the steered front wheel may be biased manually by turning the steering wheel 380, an approximately fixed relationship between the steered front wheel and the steering wheel is maintained at all times by the limitation of relative movement between pulley 394 and pulley 397. The position of the steering wheel, therefore, indicates the approximate position of the steered front wheel.

This limitation of relative movement between the steering wheel and the steered wheel, limits or confines, of course, the rate the steering wheel moves to whatever rate the steered wheel moves. The maximum speed the steering wheel can be turned, therefore, is determined by the steering motor 330, and this velocity limitation can be used to prevent the driver from maneuvering too quickly into a high speed turn.

Referring to FIGURE 19, it is seen that the vehicle, according to this embodiment, may readily be converted to a vehicle stabilized only by the combination of the rate responsive and the displacement responsive torquing mechanisms. This is accomplished by removing the cable 75 from the pulley 390 of the differential drive 375, and fixing the shaft 391 against rotation. In this condition the manually controlled steering wheel 380 will still be effective in controlling steering motor 330 to provide power steering for the vehicle.

In summary, when a vehicle according to either embodiment of the invention is parked and the engine is first started, the parking wheels will remain locked in contact with the ground and before the gyro rotor attains a predetermined speed the gimbal will be maintained in its normal position by the caging action of the displacement responsive torquing mechanism. Upon attainment of a predetermined gyro speed, valve 154 will shift to unlock the parking wheels and simultaneously block unrestricted fluid flow between the head chambers of the torquing cylinders and the opposite sides of the rate responsive cylinder or motor, or in other words, render the rate responsive torquing mechanism effective in torquing the gimbal. Simultaneously, displacement responsive torque will be applied about the gimbal axis to restore the gimbal to its normal position, which torque is small compared to the rate sensitive gimbal torque with the result that the gimbal is maintained in its normal position and the vehicle is maintained in its equilibrium position.

The gyroscopic stabilization system of the present invention has been described without specific reference as to the direction the gyro rotor should spin since stability is not affected by the direction the rotor spins. It is important, however, that the rate sensitive gimbal torque be in the direction the gimbal precesses, and that the position sensitive gimbal torque be in the direction the gimbal is displaced from its normal position.

Under these circumstances it makes little difference stability-wise which direction the rotor spins. However, in order to negotiate a turn, the gimbal must be precessed around the turn either by a rolling moment due to centrifugal force or by a rolling moment due to gravity. If the gyro is precessed by a rolling moment due to centrifugal force, less bank will be required to precess the gimbal around the turn than when a rolling moment due to gravity is employed to precess the gimbal through the turn.

In a sports car it may be more exciting to bank severely in a turn and allow gravity to precess the gimbal, but under other circumstances it may be preferable to bank less severely and allow centrifugal force to precess the gimbal through the turn. In any event, if it is desired that the vehicle overbank in a turn, the gyro rotor should spin in the direction the running wheels of the vehicle turn for forward travel. On the other hand, if it is desired to underbank in a turn, the gyro rotor should spin in a direction opposite to the direction the running wheels of the vehicle turn for normal travel.

In order to be able to steer the vehicle into turns in both directions with equal facility, the normal position of the gyro rotor spin axis should be perpendicular to the vehicle's longitudinal vertical centerplane. Also, preferably the gimbal axis is parallel to the vehicle's longitudinal normally vertical centerplane and approximately parallel to a plane perpendicular to the vehicle's roll axis.

The present invention therefore provides a gyro stabilized center tracking vehicle which is stabilized under all operating conditions. When the vehicle is stationary with the engine and the gyro not operating, the control system is not pressurized and the outrigger support wheels are locked in the down position. In order to operate the vehicle, the engine is started and drives the pump to build up pressure in the control system and to drive the gyro. Until the gyro is up to speed, the parking wheels remain locked in the down position and the gyro is retained in its normal centered position by the displacement responsive torquing system. After the gyro is up to speed, the parking wheels are unlocked and the direction of the force exerted by the displacement responsive system is reversed so that it thereafter continues to center the gimbal. Upon unlocking the parking wheels, the vehicle becomes gyroscopically stabilized and can be driven and steered over a supporting surface. Disturbing torques on the vehicle will be resisted by the gyro and manifested by precession of the gyro as a result of which the rate generating mechanism will restore equilibrium about the roll axis. Simultaneously, in the last described embodiment the gimbal steering system will steer the front wheel in a direction to laterally shift the center of gravity of the vehicle to restore equilibrium about the roll axis. Also, by biasing the null position between the front steered wheel an the gimbal centered position, the vehicle embodying the gimbal steering may be steered around a curve while maintaining the gyro near its centered position.

When the engine is stopped, the wheels are released and automatically moved to the down position. However, the wheels are not locked in the down position until the gyro speed drops below a predetermined minimum operating speed. Below this minimum operating speed, the parking wheels are automatically locked and the direction of the force exerted by the displacement responsive torquing mechanism is simultaneously reversed.

While preferred embodiments of the invention have been disclosed and described, other arrangements may be employed to apply torque to the gimbal in response to gyro precession rate. For instance, an electrical rate generating system responsive to gimbal movement can readily be utilized in place of the hydraulic system disclosed herein.

What is claimed is:

1. A vehicle supported for roll freedom about a longitudinal roll axis spaced below the center of gravity of the vehicle comprising a gyro including a gimbal mounted on the vehicle for rotation about a gimbal axis; a rotor rotatably mounted in said gimbal for rotation about a rotor spin axis, said gimbal axis and said spin axis being positioned on said vehicle for precession of said gimbal in response to a force on said vehicle about said roll axis; and means responsive to the angular rate of precession of said gimbal about said gimbal axis for applying a torque to said gimbal about said gimbal axis to precess said vehicle about said roll axis; means sensing the angular rate of precession of said gimbal about said gimbal axis, said rate responsive means being controlled by said rate sensing means to torque said gimbal about said gimbal axis in response to the angular rate of precession of said gimbal about said gimbal axis; said rate responsive means comprising a hydraulic servo mechanism including means for pumping a fluid through a conduit at a rate proportional to a generated rate signal, a flow restrictor in said conduit for producing a pressure drop in said conduit across said flow restrictor upon a flow of fluid through said conduit, and fluid motor means operatively connected to said conduit on each side of said flow restrictor for producing a torque on said gimbal about said gimbal axis, which torque is proportional to said pressure drop.

2. The gyro stabilized vehicle defined in claim 1 wherein said pump means is operable to pump fluid through said conduit in either direction with the direction of fluid through said conduit being determined by said sensing means n response to the direction of precession of said gyro about said gimbal axis.

3. The gyro stabilized vehicle defined in claim 2 wherein said motor means is operable to apply a torque about said gimbal axis in a direction determined by the direction of flow through said conduit.

4. A vehicle supported for roll freedom about a longitudinal roll axis spaced below the center of gravity of the vehicle comprising a gyro including a gimbal mounted on the vehicle for rotation about a gimpal axis; a rotor rotatably mounted in said gimbal for rotation about a rotor spin axis, said gimbal axis and said spin axis being positioned on said vehicle for precession of said gimbal in response to a force on said vehicle about said roll axis; and means responsive to the angular rate of precession of said gimbal about said gimbal axis for applying a torque to said gimbal about said gimbal axis to precess said vehicle about said roll axis; means sensing the angular rate of precession of said gimbal about said gimbal axis, said rate responsive means being controlled by said rate sensing means to torque said gimbal about said gimbal axis in response to the angular rate of precession of said gimbal about said gimbal axis; outrigger means movable between an extended position engaging a support surface on each side of said roll axis to lock said vehicle against movement about said roll axis and a retracted position spaced above the support surface to permit roll freedom about said roll axis; means responsive to displacement of said gimbal from a normal centered position for applying a torque about said gimbal axis; said displacement responsive means applying a torque about said gimbal axis in the same direction as gyro displacement when said outrigger means is in said retracted position and in the opposite direction to gyro displacement when said outrigger means is in said extended position.

5. The gyro stabilized vehicle defined in claim 4 further including releasable locking means for locking said outrigger means in said extended position, and means responsive to the locking and releasing of said outrigger means for reversing the direction in which said torque is applied by said displacement responsive means.

6. A vehicle supported for roll freedom about a longitudinal roll axis spaced below the center of gravity of the vehicle comprising a gyro including a gimbal mounted on the vehicle for rotation about a gimbal axis; a rotor rotatably mounted in said gimbal for rotation about a rotor spin axis, said gimbal axis and said spin axis being positioned on said vehicle for precession of said gimbal in response to a force on said vehicle about said roll axis; and means responsive to the angular rate of precession of said gimbal about said gimbal axis for applying a torque to said gimbal about said gimbal axis to precess said vehicle about said roll axis; means sensing the angular rate of precession of said gimbal about said gimbal axis, said rate responsive means being controlled by said rate sensing means to torque said gimbal about said gimbal axis in response to the angular rate of precession of said gimbal about said gimbal axis; outrigger means movable betwen an extended position engaging a support surface on each side of said roll axis to lock said vehicle against movement about said roll axis and a retracted position spaced above the support surface to permit roll freedom about said roll axis; and means to prevent movement of said outrigger means from said extended position to said retracted position until said gyro is operating at a speed sufficient to stabilize said vehicle.

7. A vehicle supported for roll freedom about a longitudinal roll axis spaced below the center of gravity of the vehicle comprising a gyro including a gimbal mounted on the vehicle for rotation about a gimbal axis; a rotor rotatably mounted in said gimbal for rotation about a rotor spin axis, said gimbal axis and said spin axis being positioned on said vehicle for precision of said gimbal in response to a force on said vehicle about said roll axis; and means responsive to the angular rate of precession of said gimbal about said gimbal axis for applying a torque to said gimbal about said gimbal axis to precess said vehicle about said roll axis; means sensing the angular rate of precession of said gimbal about said gimbal axis, said rate responsive means being controlled by said rate sensing means to torque said gimbal about said gimbal axis in response to the angular rate of precession of said gimbal about said gimbal axis; outrigger means movable between an extended position engaging a support surface on each side of said roll axis to lock said vehicle against movement about said roll axis and a retracted position spaced above the support surface to permit roll fredom about said roll axis; and means for moving said outrigger means from said retracted position to said extended position upon termination of the stabilizing action of the gyro on said vehicle.

8. In a gyro stabilized vehicle supported for roll freedom about a longitudinal roll axis, said vehicle having a gyro mounted for precession about a gimbal axis in response to torque on the vehicle about said roll axis, the improvement comprising means for applying a torque to said gyro about said gimbal axis in response to the rate of precession of said gyro about said gimbal axis; means for applying a torque to said gyro about said gimbal axis in response to displacement of said gyro from a normal centered position; outrigger means for engaging a support surface on each side of said roll axis, and locking means for locking said outrigger means in engagement with the support surface to lock the vehicle against movement about said roll axis, said locking means being releasable to permit roll freedom of said vehicle about said roll axis; means responsive to displacement of said gyro from its normal centered position for applying a torque about said gimbal axis in the direction of gimbal displacement when said locking means is released and in a direction opposite to gimbal displacement when said locking means is engaged, and means responsive to the locking and releasing of said locking means for reversing the direction of the torque applied by said displacement responsive means.

9. In a gyro stabilized vehicle supported for roll freedom about a longitudinal roll axis, said vehicle having a gyro mounted for precession about a gimbal axis in response to torque on the vehicle about said roll axis, the improvement comprising means for applying a torque to said gyro about said gimball axis in response to the rate of precession of said gyro about said gimbal axis; means for applying a torque to said gyro about said gimbal axis in response to displacement of said gyro from a normal centered position; outrigger means for engaging a support surface on each side of said roll axis, and locking means for locking said outrigger means in engagement with the support surface to lock the vehicle against movement about said roll axis, said locking means being releasable to permit roll freedom of said vehicle about said roll axis; said outrigger means being mounted on said vehicle for up and down movement relative thereto, and wherein said locking means comprises pawl and ratchet means normally resiliently biased into engagement to lock said outrigger means against upward movement with respect to said vehicle, and means for disengaging said pawl and ratchet to permit relative movement between said outrigger means and said vehicle to establish roll freedom of said vehicle.

10. The gyro stabilized vehicle defined in claim 9 further including means for moving said outrigger means upwardly with respect to said vehicle upon disengagement of said pawl and ratchet.

11. A vehicle supported for roll freedom about a longitudinal roll axis spaced below the center of gravity of the vehicle comprising a gyro including a gimbal mounted on the vehicle for rotation about a gimbal axis; a rotor rotatably mounted in said gimbal for rotation about a rotor spin axis, said gimbal axis and said spin axis being positioned on said vehicle for precession of said gimbal in response to a force on said vehicle about said roll axis; and means responsive to the angular rate of precession of said gimbal about said gimbal axis for applying a torque to said gimbal about said gimbal axis to precess said vehicle about said roll axis; said rate responsive means comprising fluid pump means, motor means controlled by said gyro for driving said pump to pump fluid through a conduit at a rate proportional to the rate of precession of said gyro, a flow restrictor in said conduit for producing a pressure in said conduit between said restrictor and said pump, and fluid motor means connected to the pressure side of said conduit for applying a force to said gyro to produce a torque on said gyro in the direction of said gyro precession.

12. The gyro stabilized vehicle defined in claim 8 wherein said displacement responsive torque applying means comprises two-way actuator means connected to said gimbal, and means responsive to gimbal displacement for controlling the torque application to said gimbal by said actuator means.

13. The gyro stabilized vehicle defined in claim 12 wherein said actuator controlling means comprises means responsive to the locking and releasing of said locking means for reversing the torque output of said actuator means.

14. The gyro stabilized vehicle defined in claim 8 wherein said displacement responsive torque applying means comprises a two-way actuator, arm means having a centered position corresponding to said normal centered position of said gyro and connected with said gimbal for pivotal movement in a direction and by an amount corresponding to gimbal displacement, said actuator moving said arm means toward its centered position when acting in one direction and moving said arm means away from its centered position when acting in the reverse direction.

15. The gyro stabilized vehicle defined in claim 14 wherein said arm means is supported by a fixed pivot shaft and carries a pivot rod displaced from said shaft; said actuator being pivotally supported by a pivot pin located on the opposite side of said shaft from said rod and having an output shaft pivotally connected to said rod; said pivot shaft, pin and rod being aligned when said arm means is in its centered position.

16. The gyro stabilized vehicle defined in claim 14 wherein said actuator comprises a two-way fluid motor, said torque reversing means comprising valve means responsive to the locking and releasing of said locking means for reversing the fluid flow to said motor.

17. In a gyro stabilized vehicle supported for roll freedom about a longitudinal roll axis, said vehicle having a gyro mounted for precession about a gimbal axis in response to torque on the vehicle about said roll axis, the improvement comprising, means for applying a torque to said gyro about said gimbal axis in response to precession of said gyro about said gimbal axis, and motor means for steering said vehicle in response to precession of said gyro about said gimbal axis; manually controlled means for biasing the position of said steering motor with respect to the position of said gimbal; said manually controlled biasing means including a differential transmission operably connecting said gyro and said steering motor, and a manually operated steering controller operably connected to said differential transmission for biasing the relative positions of said steering motor and said gyro.

18. The gyro stabilized vehicle defined in claim 17 further including means for limiting the movement of said manually operated steering controller with respect to said steering motor.

19. A gyro stabilized vehicle comprising:
a vehicle frame;
means forward and rearward of the center of gravity of said vehicle for supporting said frame for translational movement over a supporting surface and for angular freedom about a roll axis;
a gimbal mounted on said frame for angular freedom about a gimbal axis;
said gimbal moving angularly with said frame about said roll axis;
said gimbal being supported for substantial free movement relative to said frame about said gimbal axis only;
a rotor of substantial mass rotatably mounted in said gimbal for rotation about a rotor spin axis;
said gimbal axis having a component substantially parallel to a first plane;
said first plane being perpendicular to said roll axis;
said gimbal axis having a component substantially parallel to a second plane;
said second plane being perpendicular to said spin axis;
said gimbal having a normal position about said gimbal axis in which a component of said spin axis is substantially parallel to said first plane;
said center of gravity of said vehicle being above said roll axis;
said frame having a position of equilibrium about said roll axis for each of various combinations of forces acting externally on said frame about said roll axis;
said external forces producing torque acting on said frame about said roll axis when said vehicle is not in said equilibrium position;
said frame torque generating gimbal precessional motion in space about said gimbal axis;
said gimbal precessional motion being in either direction throughout a substantial angular range about said gimbal axis;
said angular range extending through said normal gimbal position from an extreme gimbal position on one side of said normal gimbal position to an extreme gimbal position on the other side of said normal gimbal position;
said gimbal being unrestrained within said range to the extent that substantially the velocity of said gimbal precessional motion in space is directly proportional to said frame torque and inversely proportional to the angular momentum of said rotor about said spin axis;
said gimbal precessional motion changing direction in space when said frame torque changes direction;
said gimbal precessional motion producing internal gyroscopic countertorque acting on said frame about said roll axis;
said gimbal precessional motion producing said frame countertorque independently of the position of said gimbal throughout said range short of said extreme gimbal position;
said frame countertorque being substantially equal in magnitude and opposite in direction to said frame torque;
said frame countertorque stabilizing said vehicle substantially against said frame torque;
motion sensing means activated by angular motion of said gimbal relative to said frame about said gimbal axis;
said motion sensing means being responsive to the direction of said angular gimbal motion at gimbal positions throughout said range on either side of said normal gimbal position;

motion responsive gimbal torquing means controlled by said motion sensing means for applying motion responsive gimbal torque to said gimbal about said gimbal axis;

said motion responsive torque acting on said gimbal causing precessional motion of said frame in space about said roll axis;

said motion responsive torque being applied about said gimbal axis in the direction of said angular gimbal motion about said gimbal axis;

said frame precessional motion changing in direction when said angular gimbal motion changes in direction about said gimbal axis;

said frame precessional motion prdoucing internal gyroscopic gimbal countertorque acting on said gimbal about said gimbal axis;

said gimbal countertorque being substantially equal in magnitude and opposite in direction to said motion responsive torque;

said gimbal countertorque stabilizing said gimbal substantially against said motion responsive torque;

said motion responsive torque at a given instant during said frame precessional motion directing said frame precessional motion toward the position peculiar to said frame equilibrium at substantially said instant;

said frame precessional motion reducing said frame torque and simultaneously decelerating the angular velocity of said gimbal relative to said frame about said gimbal axis during application of said motion responsive torque;

said motion responsive torque and said angular gimbal velocity reaching zero substantially simultaneously;

said motion responsive torque influencing the velocity of said frame precessional motion according to the magnitude of said motion responsive torque;

said motion responsive gimbal torquing means comprising a high torque motor capable of generating high velocity precessional motion of said frame about said roll axis to enable said frame to reach said equilibrium position before said gimbal reaches said extreme position; and means for moderating the said velocity of gimbal precessional motion in space comprising a high speed gyro rotor spin motor generating high angular momentum about said spin axis.

20. The vehicle defined in claim 19 further comprising:

a displacement sensor responding to displacement of said gimbal from said normal position in either direction about said gimbal axis;

means controlled by said displacement sensor for producing a roll moment acting on said frame in either direction about said roll axis according to the direction of said gimbal displacement;

said roll moment being in a direction to precess said gimbal toward said normal position about said gimbal axis.

21. The vehicle defined in claim 20 wherein said displacement sensor controlled means for producing said roll moment comprises displacement responsive gimbal torquing means for applying displacement responsive torque to said gimbal in said either direction about said gimbal axis; said displacement responsive gimbal torque being applied in the direction of said gimbal displacement about said gimbal axis.

22. The vehicle defined in claim 21 wherein said displacement responsive gimbal torque generates corresponding precession of said frame producing displacement of said frame to one side or the other of the equilibrium position of said frame; said roll moment being a function of said frame displacement.

23. The vehicle defined in claim 19 wherein said gimbal is substantially immovable relative to said frame about said roll axis.

24. The vehicle defined in claim 19 wherein said motion sensing means is responsive to said angular gimbal velocity and said motion responsive gimbal torque is a function of said angular gimbal velocity.

25. The vehicle defined in claim 19 wherein said rearward frame supporting means comprises a rear road wheel arranged for rotation about a generally horizontal wheel axis; said spin axis being substantially parallel to said road wheel axis when said gimbal is in said normal gimbal position; said rotor being driven for rotation about said spin axis in a direction opposite to the direction of rotation of said road wheel when said spin axis is parallel to said road wheel axis and said vehicle is moving forward.

26. A steerable gyro stabilized vehicle comprising:

a vehicle frame;

means forward and rearward of the center of gravity of said vehicle for supporting said frame for translational movement over a supporting surface and for angular freedom about a roll axis;

said center of gravity being above said roll axis;

a gimbal mounted on said frame for angular freedom about a gimbal axis;

said gimbal being movable angularly with said frame about said roll axis;

said gimbal being movable relative to said frame about said gimbal axis;

a rotor of substantial mass rotatably mounted in said gimbal for rotation about a rotor spin axis;

said vehicle having a geometrical vertical axis defined by a line joining said center of gravity and said roll axis;

said geometrical vertical axis and said roll axis defining a first plane;

said gimbal axis being substantially parallel to said first plane;

said gimbal axis being substantially parallel to a second plane;

said second plane being perpendicular to said roll axis;

said gimbal axis being substantially parallel to a third plane;

said third plane being perpendicular to said spin axis;

said gimbal having a normal position about said gimbal axis in which said spin axis is substantially parallel to said second plane;

said frame having a position of equilibrium about said roll axis for each of various combinations of forces acting externally on said frame about said roll axis;

said external forces producing torque acting on said frame about said roll axis when said frame is not in said equilibrium position;

said frame torque generating gimbal precessional motion in space about said gimbal axis;

said gimbal precessional motion being in either direction throughout a substantial angular range about said gimbal axis;

said angular range extending through said normal gimbal position from an extreme gimbal position on one side of said normal gimbal position to an extreme gimbal position on the other side of said normal gimbal position;

said gimbal being unrestrained within said range to the extent that substantially the velocity of said gimbal precessional motion in space is directly proportional to said frame torque and inversely proportional to the angular momentum of said rotor about said spin axis;

said gimbal precessional motion changing direction in space when said frame torque changes direction;

said gimbal precessional motion producing internal gyroscopic countertorque acting on said frame about said roll axis;

said gimbal precessional motion producing said frame countertorque independently of the position of said gimbal throughout said range short of said extreme gimbal position;

said frame counertorque being substantially equal in magnitude and opposite in direction to said frame torque; said frame countertorque stabilizing said vehicle substantially against said frame torque;

motion sensing means activated by angular motion of said gimbal relative to said frame about said gimbal axis;

said motion sensing means being responsive to the direction of said angular gimbal motion at gimbal positions on either side of said normal gimbal position;

motion responsive gimbal torquing means controlled by said motion sensing means for applying motion responsive gimbal torque to said gimbal about said gimbal axis;

said motion responsive torque acting on said gimbal causing precessional motion of said frame in space about said roll axis;

said motion responsive torque being applied about said gimbal axis in the direction of said angular gimbal motion about said gimbal axis;

said frame precessional motion changing in direction when said angular gimbal motion changes in direction about said gimbal axis;

said frame precessional motion producing internal gyroscopic gimbal countertorque acting on said gimbal about said gimbal axis;

said gimbal countertorque being substantially equal in magnitude and opposite in direction to said motion responsive torque;

said gimbal countertorque stabilizing said gimbal substantially against said motion responsive torque;

said motion responsive torque at a given instant during said frame precessional motion directing said frame precessional motion toward the position peculiar to said frame equilibrium at substantially said instant;

said frame precessional motion reducing said frame torque and simultaneously decelerating the angular velocity of said gimbal relative to said frame about said gimbal axis during application of said motion responsive torque;

said motion responsive torque and said angular gimbal velocity reaching zero substantially simultaneously;

said motion responsive torque influencing the velocity of said frame precessional motion according to the magnitude of said motion responsive torque;

said motion responsive gimbal torquing means comprising a high torque motor operably connected between said frame and said gimbal;

a displacement sensor responding to displacement of said gimbal from said normal position in either direction about said gimbal axis;

means controlled by said displacement sensor for producing a roll moment acting on said frame in either direction about said roll axis according to the direction of said gimbal displacement;

said roll moment being in a direction to precess said gimbal toward said normal position about said gimbal axis;

means also controlled by said displacement sensor for applying gimbal torque in either direction about said gimbal axis;

said displacement sensor controlled gimbal torque being applied in the direction of said gimbal displacement about said gimbal axis; and means for moderating the precessional velocity in space of said gimbal and said frame comprising a high speed gyro rotor spin motor generating high angular momentum about said spin axis, and steering means allowing controlled turning of said vehicle on said supporting surface; said controlled turning correspondingly influencing angular gimbal velocity relative to said frame.

27. The vehicle defined in claim 26 wherein said gyro rotor motor spins in a counterclockwise direction looking at said rotor in the direction of said spin axis from the right side of said vehicle with said gimbal in said normal gimbal position.

28. The vehicle defined in claim 27 wherein said motion sensing means is responsive to said angular gimbal velocity and said motion repsonsive gimbal torque is a function of said angular gimbal velocity.

References Cited

UNITED STATES PATENTS

| | | | |
|---|---|---|---|
| 991,485 | 5/1911 | Darrow | 74—5.22 X |
| 1,236,030 | 8/1917 | Wilson | 180—21 |
| 1,362,024 | 12/1920 | McKee | 180—30 |
| 1,513,143 | 10/1924 | Welch et al. | 74—5.22 X |
| 1,992,086 | 2/1935 | Meredith et al. | |
| 3,124,007 | 3/1964 | Swinney | 180—33 X |
| 3,145,797 | 8/1964 | Taylor | 180—21 |
| 3,236,323 | 2/1966 | Austin | 180—30 |
| 3,277,840 | 10/1966 | Li | 74—5 |
| 3,373,832 | 3/1968 | Summers | 180—30 |

KENNETH H. BETTS, Primary Examiner

U.S. Cl. X.R.

74—5.22